United States Patent
Benson et al.

(10) Patent No.: US 10,726,744 B2
(45) Date of Patent: Jul. 28, 2020

(54) APPARATUS AND METHOD FOR SIMULATED HEALTH CARE PROCEDURES IN COMBINATION WITH VIRTUAL REALITY

(71) Applicant: ReaLifeSim, LLC, Jacksonville, FL (US)

(72) Inventors: Elizabeth M. Benson, La Plata, MD (US); Linda C. Goodman, LaPlata, MD (US); Donald Platt, Melbourne, FL (US); James R. Benson, La Plata, MD (US)

(73) Assignee: REALIFESIM, LLC, Jacksonville, FL (US)

( * ) Notice: Subject to any disclaimer, the term of this patent is extended or adjusted under 35 U.S.C. 154(b) by 302 days.

(21) Appl. No.: 15/406,358

(22) Filed: Jan. 13, 2017

(65) Prior Publication Data

US 2017/0229044 A1 Aug. 10, 2017

Related U.S. Application Data

(60) Provisional application No. 62/291,706, filed on Feb. 5, 2016.

(51) Int. Cl.
*G09B 23/34* (2006.01)
*G09B 23/28* (2006.01)
*G06F 3/16* (2006.01)

(52) U.S. Cl.
CPC ............ *G09B 23/34* (2013.01); *G06F 3/165* (2013.01); *G09B 23/285* (2013.01)

(58) Field of Classification Search
CPC ....... G09B 23/34; G09B 23/285; G06F 3/014; G06F 3/165

USPC ................................ 434/268, 262, 267, 272
See application file for complete search history.

(56) References Cited

U.S. PATENT DOCUMENTS

| | | | | |
|---|---|---|---|---|
| 4,182,054 A | * | 1/1980 | Wise | G09B 23/285 434/268 |
| 5,215,469 A | * | 6/1993 | Kohnke | G09B 23/285 434/268 |
| 2004/0009459 A1 | * | 1/2004 | Anderson | G06F 19/3481 434/262 |
| 2004/0039530 A1 | * | 2/2004 | Leesman | G16C 20/30 702/19 |

(Continued)

*Primary Examiner* — David L Lewis
*Assistant Examiner* — Shauna-Kay Hall
(74) *Attorney, Agent, or Firm* — Joseph P. Kincart; Rogers Towers, P.A.

(57) ABSTRACT

A medical/veterinary procedure simulation apparatus includes a simulated mammalian body part. The simulated mammalian body part further includes one or more anatomical replications of mammalian tissue. The apparatus also includes an attaching substrate for fixedly attaching the simulated body part to a mammal or a model of the mammal. The apparatus further includes one or more sensors configured to provide a quantified measurement of one or more actions, pertaining to at least one medical procedure. The apparatus further includes a virtual reality system configured to receive one or more input signals from the one or more sensors. The virtual reality system is further configured to display at least one visual representation of at least one clinical procedure being performed on the one or more anatomical replications based on the one or more input signals from the one or more sensors.

10 Claims, 24 Drawing Sheets

(56) References Cited

U.S. PATENT DOCUMENTS

| | | | | |
|---|---|---|---|---|
| 2005/0032028 A1* | 2/2005 | Chosack | G09B 23/32 | 434/262 |
| 2007/0218438 A1* | 9/2007 | Sanders | G09B 23/28 | 434/236 |
| 2007/0292829 A1* | 12/2007 | King | G09B 23/285 | 434/268 |
| 2008/0227073 A1* | 9/2008 | Bardsley | G09B 23/30 | 434/267 |
| 2009/0011394 A1* | 1/2009 | Meglan | G09B 23/28 | 434/268 |
| 2009/0112538 A1* | 4/2009 | Anderson | G09B 23/28 | 703/6 |
| 2009/0246747 A1* | 10/2009 | Buckman, Jr. | G09B 23/285 | 434/272 |
| 2011/0200977 A1* | 8/2011 | Paronen | G09B 23/285 | 434/268 |
| 2012/0199633 A1* | 8/2012 | Shelton, IV | A61B 17/07207 | 227/177.1 |
| 2013/0052626 A1* | 2/2013 | Hoskins | G09B 23/30 | 434/268 |
| 2013/0078603 A1* | 3/2013 | Yang | G09B 23/285 | 434/268 |
| 2013/0323700 A1* | 12/2013 | Samosky | G09B 23/28 | 434/262 |
| 2014/0154656 A1* | 6/2014 | Segall | G09B 23/285 | 434/265 |
| 2014/0377731 A1* | 12/2014 | Conrad | G09B 23/303 | 434/268 |
| 2015/0148825 A1* | 5/2015 | Orion | A61B 17/11 | 606/153 |

* cited by examiner

400

400

500

500

700

900

US 10,726,744 B2

APPARATUS AND METHOD FOR SIMULATED HEALTH CARE PROCEDURES IN COMBINATION WITH VIRTUAL REALITY

CROSS-REFERENCE TO RELATED APPLICATIONS

This application claims the benefit of U.S. Provisional Application Ser. No. 62/291,706 filed on Feb. 5, 2016, the entire content of which is hereby incorporated by reference in its entirety.

FIELD OF THE INVENTION

The present invention relates to apparatus and methods for training clinical care practitioners with a combination of simulated health care devices and virtual reality systems. More specifically, the present invention relates to simulated human and animal body parts and methods of training by utilizing the simulated body parts and interaction of the simulated body parts with virtual reality systems.

BACKGROUND

Learning in medical and veterinary clinical skills frequently utilizes an apprenticeship model. The apprenticeship model has been a standard method for clinical education for decades and is aimed at providing hands-on experience to a learner. It is hoped learners encounter enough situations to ensure they become competent surgeons or medical practitioners. However, the standard apprenticeship model is limited in providing enough exposure, due to unavailability of varied cases to enhance skills, and in humans the unavailability of standardized patients who are willing to risk being treated by a learner. The standard apprenticeship model is also constrained by a specialization of a teacher or a mentor. Complications, arising out of these limitations, ultimately makes this a haphazard way to learn, and puts learners and patients at a disadvantage.

Simulation education offers valuable learning experiences that can be scheduled and observed; unlike in real life where clinical learning opportunities may not present when a student is available. Learners address critical thinking and hands-on skills, including knowledge-in-action, procedures, decision-making, and effective communication.

As clinical simulation in healthcare education continues to evolve, the use of standardized participants to improve skills, clinical care, and communication embodies this paradigmatic shift for training. High fidelity simulation has and will continue to play an important role in healthcare and veterinary care simulation, but in humans cannot take the place of direct human interaction.

Standardized participants with a wearable simulating device provide healthcare students and clinicians the opportunity to interact with a real person providing the most realistic simulation possible. The standardized participants are carefully recruited and trained to take on the characteristics of a real patient thereby affording the student an opportunity to learn and to be evaluated on learned skills in a simulated clinical environment.

SUMMARY

Accordingly, the present invention provides simulated body portions with interactive areas and monitoring devices useful for the training of procedures to take place on human and animal patients.

Embodiments in accordance with the present invention are directed to a medical procedure simulation apparatus. The apparatus can include a simulated mammalian body part. The simulated mammalian body part further includes one or more anatomical replications of mammalian tissue. The apparatus can also include an attaching substrate for fixedly attaching the simulated body part to a mammal or a model of the mammal. The apparatus can further include one or more sensors configured to provide a quantified measurement of one or more actions. The one or more action pertains to at least one medical procedure that can be performed on the one or more anatomical replications of mammalian tissue. The apparatus can also interface with a virtual reality system configured to receive one or more input signals from the one or more sensors. The virtual reality system is further configured to display at least one visual representation of the at least one medical procedure being performed on the one or more anatomical replications based on the one or more input signals from the one or more sensors.

Embodiments in accordance with the present invention are further directed to a medical procedure simulation apparatus for simulating tracheostomy care and tracheostomy tube replacement. The apparatus can include a bib configured to at least partly cover a torso of a mammal or a model of the mammal. Further, the bib simulates one or more truncal tissues. The apparatus can further include a collar connected with the bib. The collar includes a stoma. The apparatus can also include an outer cannula received at least partly within the stoma. The outer cannula includes a flange or a neck plate. The apparatus can further include an inner cannula received within the outer cannula. The apparatus can also include an obturator received within the inner cannula. The apparatus can further include an inflatable bag coupled to the outer cannula. The apparatus can also include an attaching substrate for fixedly attaching the collar to a neck of the mammal or the model of the mammal. The apparatus can further include one or more sensors configured to provide a quantified measurement of one or more actions, pertaining to tracheostomy care and tracheostomy tube replacement, performed on the bib. The apparatus can further include a virtual reality system configured to receive one or more input signals from the one or more sensors. The virtual reality system is further configured to display at least one visual representation of tracheostomy care and/or tracheostomy tube replacement being performed on the bib, based on the one or more input signals from the one or more sensors.

Embodiments in accordance with the present invention are further directed to a medical procedure simulation apparatus including an arm-sleeve with one or more anatomical replications of a mammalian appendage. The apparatus can also include an attaching substrate for fixedly attaching the arm-sleeve to an appendage of a mammal or a model of the mammal. The apparatus can further include one or more sensors configured to provide a quantified measurement of one or more actions, pertaining to at least one medical procedure, performed on the arm-sleeve. The apparatus can also include a virtual reality system configured to receive one or more input signals from the one or more sensors. The virtual reality system is further configured to display at least one visual representation of the at least one medical procedure being performed on the arm-sleeve based on the one or more input signals from the one or more sensors.

The medical procedure simulation apparatus allows users to practice surgical procedures—surgical procedures is not really accurate; medical or clinical interventions or procedures with actual surgical—medical or clinical instruments, thereby enhancing the educational experience by allowing for a high-fidelity surgical-clinical simulation offering immediate tactile, audio, and visual feedback.

These and other advantages will be apparent from the present application of the embodiments described herein.

The preceding is a simplified summary to provide an understanding of some embodiments of the present disclosure. This summary is neither an extensive nor exhaustive overview of the present disclosure and its various embodiments. The summary presents selected concepts of the embodiments of the present disclosure in a simplified form as an introduction to the more detailed description presented below. As will be appreciated, other embodiments of the present disclosure are possible utilizing, alone or in combination, one or more of the features set forth above or described in detail below.

BRIEF DESCRIPTION OF THE DRAWINGS

The accompanying drawings, which are incorporated in and constitute a part of this specification, illustrate several embodiments of the disclosure and, together with the description, explain the principles of the disclosure.

Figure 1:
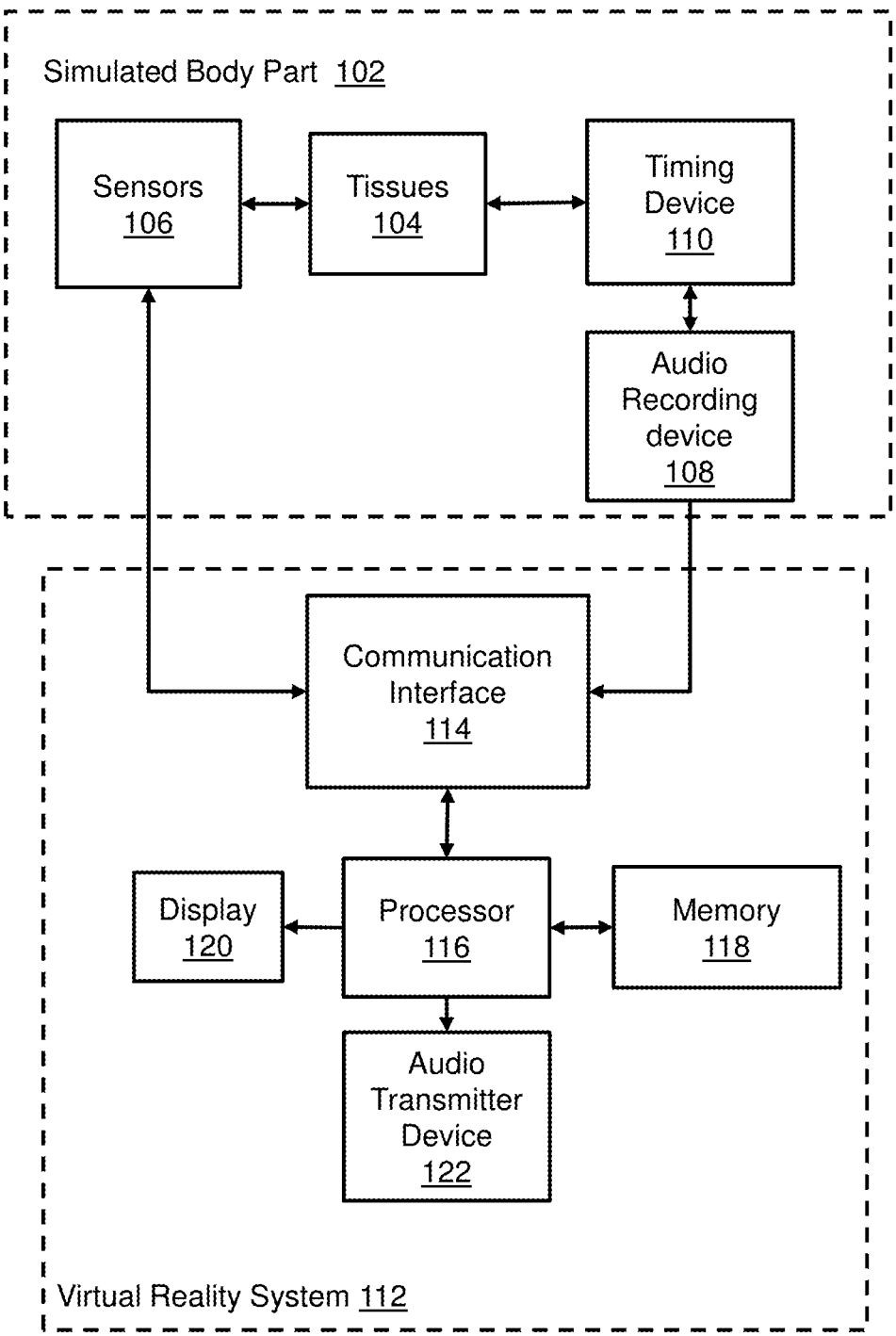
FIG. 1 illustrates an exemplary system for a medical procedure simulation, in accordance with an embodiment of the present disclosure.

While embodiments of the present disclosure are described herein by way of example using several illustrative drawings, those skilled in the art will recognize the present disclosure is not limited to the embodiments or drawings described. It should be understood the drawings and the detailed description thereto are not intended to limit the present disclosure to the form disclosed, but to the contrary, the present disclosure is to cover all modification, equivalents and alternatives falling within the spirit and scope of embodiments of the present disclosure as defined by the appended claims.

The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the figures.

DETAILED DESCRIPTION

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted the terms "comprising", "including", and "having" can be used interchangeably.

The term "High-fidelity patient simulation" refers to the use of computerized mannequins that simulate real-life scenarios.

For the purposes of the present disclosure, the term "model" may refer to a mannequin, a mammalian body part or a replica of a mammalian body part.

A standardized participant is a person carefully recruited and trained to take on the characteristics of a real patient thereby affording the student an opportunity to learn and to be evaluated on learned skills in a simulated clinical environment.

The innovation presented herein may be useful for training for a tracheostomy which may be considered an opening (stoma) surgically created through the neck into the trachea to allow direct access to the breathing tube. Additional procedures for which the innovation may be applied may include: wearable DVT; wearable gangrene/wound; wearable wounds with blood and/or exudate for all body parts including head; wearable sleeve for arm or leg for compartment syndrome; wearable Lactation breasts, IV, hemodialysis, central lines, DVT, gangrene, wounds, and other applications.

FIG. 1 illustrates a medical simulation apparatus 100, in accordance with an embodiment of the present disclosure. The apparatus 100 includes a simulated mammalian body part 102 (herein after referred to as "the simulated body part 102") and a virtual reality system 112. The simulated body part 102 may be placed on a standardized patient, a model, and robo-pet or on a mannequin. The simulated body part 102 may be used to conduct a medical procedure for training purposes. In some embodiments, the simulated body part 102 is composed of various materials such as, but not limited to, silicone, latex, textiles, metals, fluids, algin, fillers, sequestriants, a calcium source, water, and preservatives, and is molded to have the appearance of a finger, torso, a hand and so forth. In some other embodiments, the simulated body part 102 is composed of a material such as, polyvinyl chloride with a controlled amount of plasticizer. Further, the simulated body part 102 includes one or more anatomical replications 104 of mammalian tissue (herein after referred to as "the tissues 104"). In an embodiment, the tissues 104 may include one or more conductive layers such that an insertion of a surgical-clinical tool completes an electrical circuit. In general, sensors in each product quantify a correct or incorrect aspect during performance of an act signifying proper exercise of a skill/procedure. The sensors may provide immediate or summarized feedback via an audio or visual cue and data generated and available via a user interface, such as an App review.

The tissues 104 are sized, shaped, and formed of a suitable material to mimic human or animal anatomy. In particular, the tissues 104 incorporate realistic texture, density, and landmarks, thereby allowing manipulation, cutting, insertions/removals, and suturing as performed on real human tissue. The tissues 104 allow users to perform a range of surgical-clinical interventions, such as, but not limited to, dialysis arteriovenous (AV) grafts, fistula, veni-punctures, intravenous therapy, tracheostomy, wound care, and so forth. In some embodiments, the tissues 104 may be formed of materials such as, but not limited to, polysilioxane, silicon, polyvinyl chloride, silicone, latex, textiles, fluids, and so forth. Further, the tissues 104 mimic physical properties of biological tissue such as, but not limited to, low flexural modulus (tendency for a material to bend), high elasticity (the power or ability to return to original form or position after being bent, compressed, or stretched), and self-sealing characteristics (ability to automatically seal punctures).

For example, the simulated body part 102 may represent a single or multi-vessel arm-sleeve, which includes anatomical replications of one or more blood vessels. The tissues 104 include representations or non-biological replicas of adipose tissue or fat and connective tissue that houses blood vessels and nerves. In some embodiments, the multi-vessel arm-sleeve may be worn by a standardized patient or placed on a mannequin/training arm. Further, the single or multi-vessel arm-sleeve simulates various medical procedures such as, but not limited to, dialysis arteriovenous (AV) grafts and fistulas. Further, the multi-vessel arm-sleeve may provide ventral and dorsal access in order to perform the aforementioned various medical procedures.

In some other embodiments, the simulated body part 102 may represent a single or multi-vein arm-sleeve, which includes anatomical replications of one or more veins. Further, the single or multi-vein arm-sleeve may be worn by a standardized patient, animal, robo-pet or placed on a mannequin/training arm to simulate various medical procedures such as, but not limited to, veni-puncture, intravenous therapy and so forth. Veni-puncture is the process of obtaining intravenous access for intravenous therapy or for blood sampling of venous blood.

In some other embodiments, the simulated body part 102 may be a multi-vessel chest, which includes one or more anatomical replications of an artery, a vein and an organ. The anatomical replications of the artery, the vein and the organ constitute one or more tissues. Alternatively, the multi-vessel chest may include a complete anatomical replication of a truncal tissue of a mammal. Further, the multi-vessel chest device may provide external jugular and central venous access to simulate various medical procedure such as, but not limited to, jugular punctures, emergency fluid infusion, and chemotherapy infusion, administration of specific medications, emergency hemodialysis filtration, and infusion of blood products simulation. Moreover, the multi-vessel chest is configured to be worn by a mammal, robo-pet, manikin, or a model of the mammal around the chest and secured to the chest with the help of belts or Velcro® straps or other removeable fastener In some other embodiments, the simulated body part 102 may represent a bib-style device configured to be worn around a neck of the mammal or the model of the mammal. The bib-style device may include a bib, configured to at least partly cover a torso of the mammal or the model of the mammal. The bib-style device further includes a collar connected with the bib. The collar includes a stoma. The stoma is an opening created surgically through the neck into the trachea to allow direct access to the breathing tube. Further, the stoma accommodates an outer cannula, an inner cannula, an obturator and an inflatable bag for tracheostomy.

In some other embodiments, the simulated body part 102 may be a three-fingered glove. The three-fingered glove is configured to be worn by the mammal or the model of the mammal to simulate finger-stick glucose check. The three-fingered glove may simulate various actions such as, but not limited to, holding a person's hand or other bodily part, interacting with a patient, prepping an associated area of the patient, performing a puncture, visualizing a fluid to be collected on a testing strip, using a glucose meter and so forth. Further, the three-fingered glove may include a realistic skin cover, puncture pads, self-sealing and multiple-puncture resistant fingertip bags, protective puncture-proof material wrapping the fingertips within the glove, and replaceable mini-solution bags containing standardized solutions.

The simulated body part 102 may also include one or more sensors 106 (herein after referred to as "the sensors 106"). The sensors 106 provide a quantified measurement of one or more actions, pertaining to at least one medical procedure. In some embodiments, the sensors 106 can be arranged between a simulated outer skin, an intermediate layer and a sensing layer of the simulated body part 102. In an embodiment, the sensing layer and/or the intermediate layer can be a conductive layer which completes an electrical circuit upon contact with a surgical tool. Examples of the sensors 106 can include linear accelerometers, hall-effect sensors, gyroscopes, pressure sensors, proximity sensors, temperature sensors and so forth. The sensors 106 may provide a quantified measurement of the medical procedure such as, location of a procedure, a pressure, a temperature, removal or insertion of fluid, time required to execute the medical procedure or other variables that are useful to determine a level of proficiency demonstrated by the practitioner while performing the medical procedure.

Further, the simulated body part 102 may also include an audio recording device 108. The audio recording device 108 captures audio data during the various medical procedures. In some embodiments, the audio data may pertain to an action being performed by a practitioner and a rationale behind taking the action. Further, the audio data may be directed to voice recitations captured using the audio recording device 108. Moreover, the audio recording device 108 can be any microphone device that can capture audio. In some embodiments, a combination of the data collected through the sensors 106 and the audio data may indicate whether a proper procedure was followed. Alternatively, the simulated body part 102 may include one or more audio recording devices 108 to memorialize or record the practitioner/patient interaction.

The simulated body part 102 may further include a timing device 110. The timing device 110 measures elapsed time intervals in hours, minutes, seconds, and fractions of a second during the medical procedure. The timing device 110 can be any clock mechanism such as, but not limited to, oscillators. Further, the timing device 110 synchronizes the audio data captured using the audio recording device 108 with one or more actions pertaining to the at least one medical procedure.

The apparatus 100 also includes an attaching substrate (not shown) for fixedly attaching the simulated body part 102 to a mammal or a model of the mammal. The attaching substrate may be any attaching mechanism such as, but not limited to, a Velcro® strap, a belt with a buckle and so forth.

The audio data captured using the audio recording device 108, the data captured using the sensors 106, and the synchronized data by the timing device 110 may be communicated to a virtual reality system 112 using a communication interface 114.

The communication interface 114 provides a two-way data communication between the simulated body part 102 and the virtual reality system 112. The communication interface 114 receives the one or more input signals from the one or more sensors 106. In some embodiments, the communication interface 114 may be a wired link between the simulated body part 102 and the virtual reality system 112 such as, but not limited to, standard serial ports, parallel ports, universal serial bus (USB) ports, S-video ports, large area network (LAN) ports, small computer system interface (SCSI) ports, and so forth. In some other embodiments, the communication interface 114 may be a wireless link between the simulated body part 102 and the virtual reality system 112 such as, but not limited to, infrared ports, optical ports, Bluetooth wireless ports, wireless LAN ports, or the like.

A processing system 112 utilized to implement some of the functionality discussed herein may include a processor 116 configured to generate at least one visual representation of at least one medical procedure being performed on the one or more anatomical replications based on the one or more input signals received at the communication interface 114. In some embodiments, the processor 116 may execute a program code received, and/or stored in a memory device, or other non-volatile memory for the generation of the at least one visual representation. The program code is a set of instructions or statements providing instructions for the operation of the processor 116 to generate the at least one visual representation of the medical procedure. The processor 116 may be implemented as mechanical, electrical, magnetic, optical, chemical, or quantum components, among others, alone or in combination.

The processor 116 may be coupled to a memory 118, configured to store information relating to at least one visual representation, the at least one medical procedure and the one or more input signals. In some embodiments, the memory 118 may also store the audio data captured using the audio recording device 108. The memory 118, such as a Random-Access Memory (RAM) or any other dynamic storage device, stores information including instructions to be executed by the processor 116. The memory 118 may also allow information stored therein to be changed by the processor 116. The memory 118 can include any memory device such as, but not limited to, a magnetic disk, a solid-state disk, an optical disk, a flash card and so forth.

The processor 116 may be coupled to a display 120, such as, but not limited to, a cathode ray tube (CRT), a liquid crystal display (LCD), a plasma display panel (PDP), an organic light-emitting diode (OLED) display, a projector, or a heads-up display for displaying the at least one visual representation of the at least one of the medical procedure. In some embodiments, the display 120 may be configured to display the visual representation of the medical procedure in various dimensions such as, but not limited to, two-dimensional (2D), three-dimensional (3D), and so on.

The virtual reality system 112 further includes an audio transmitter device 122. The audio transmitter device 122 is configured to replicate the audio data stored in the memory 118. In some embodiments, the processor 116 may combine at least one visual representation with the audio data to provide a more clear and concise virtual representation of at least one of the medical procedure. In various embodiments, the audio transmitter device 122 may include a sound card or an audio amplifier for generating audio signals pertaining to the medical procedure. Further, the audio transmitter device 122 may also include a speaker for emanating audio corresponding to the audio signals.

Figure 2:
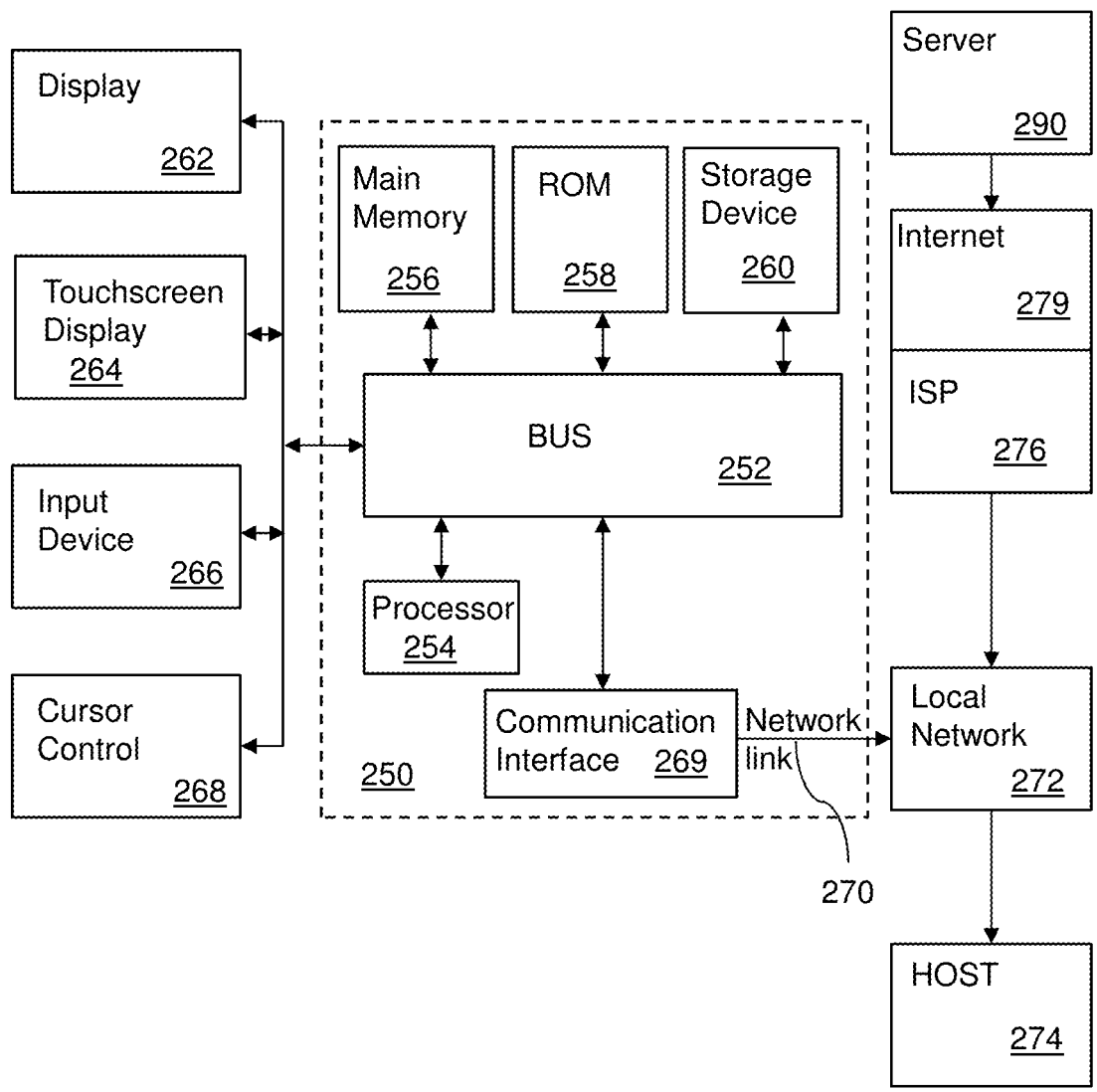
FIG. 2 is a computer system that can be used to implement various exemplary embodiments of the present disclosure.

Referring now to FIG. 2, additional aspects of a controller hardware useful for implementing embodiments of the present invention are illustrated as a block diagram 200 that includes a controller 250 upon which an embodiment of the invention may be implemented. For example, the controller 250 may be used to implement the virtual reality system 112 described above. The controller 250 includes a bus 252 or other communication mechanism for communicating information, and a processor 254 coupled with the bus 252 for processing information pertaining to the at least one medical procedure.

In still other aspects, such as, for example, if the practitioner is unaware of the medical procedure, then the practitioner has the ability to select the medical procedure from a terminal (or into an app provided on a mobile device) to guide the practitioner along the procedure.

The controller 250 also includes a main memory 256, such as a random access memory (RAM) or other dynamic storage device, coupled to the bus 252 for storing information and instructions to be executed by the processor 254. The main memory 256 may also be used for storing temporary variables or other intermediate information during execution of instructions to be executed by the processor 254. The controller 250 further includes a read only memory (ROM) 258 or any other static storage device 260.

The controller 250 may be coupled via the bus 252 to a display 262, such as a cathode ray tube (CRT), a liquid crystal display (LCD), a plasma display panel (PDP), an organic light-emitting diode (OLED) display, projector, or a heads-up display for displaying information to a computer user. An input device 266, including alphanumeric and other keys, may be coupled to the bus 252 for communicating information and command selections to the processor 254. Another type of user input device is a cursor control 268, such as a mouse, a trackball, a touchpad, or cursor direction keys for communicating direction information and command selections to the processor 254 and for controlling cursor movement on the display 262. Another type of user input device is a touchscreen display 264 where the practitioner may communicate information and command selections to the processor 254 by tactile interaction with the display 262 thereby controlling cursor movement or alphanumeric and other keys. This input device typically has two degrees of freedom in two axes, a first axis (e.g., x) and a second axis (e.g., y), that allows the device to specify positions in a plane.

Embodiments of the invention are related to the use of the controller 250 for setting operational parameters relating to the at least one medical procedure. In accordance with an embodiment of the invention, layering system parameters are defined and managed by the controller 250 in response to the processor 254 executing one or more sequences of one or more instructions contained in the main memory 256. Such instructions may be read into the main memory 256 from another computer-readable medium, such as the storage device 260. Execution of the sequences of instructions contained in the main memory 256 causes the processor 254 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to the processor 254 for execution. Such a medium may take many forms, including but not limited to, non-volatile media, volatile media, and transmission media. Non-volatile media includes, for example, optical or magnetic disks, such as the storage device 260 and 258. Volatile media includes dynamic memory, such as the main memory 256. Transmission media includes coaxial cables, copper wire and fiber optics, including the wires that comprise the bus 252. Transmission media may also take the form of acoustic or light waves, such as those generated during radio wave and infrared data communications.

Common forms of computer-readable media include, for example, a memory stick, hard disk or any other magnetic medium, a CD-ROM, any other optical medium, a RAM, a PROM, and EEPROM, any other memory chip or cartridge, or any other medium from which a computer may read.

Various forms of computer readable media may be involved in carrying one or more sequences of one or more instructions to the processor 254 for execution. For example, the instructions may initially be carried on a magnetic disk of a remote computer. The remote computer can load the instructions into its dynamic memory and send the instructions over a distributed network such as the Internet. A communication device may receive the data on the telephone line, cable line, or fiber-optic line and use an infrared transmitter to convert the data to an infrared signal. An infrared detector can receive the data carried in the infrared signal and appropriate circuitry can place the data on the bus 252. The bus 252 carries the data to the main memory 256, from which the processor 254 retrieves and executes the instructions. The instructions received by the main memory 256 may optionally be stored on the storage device 260 either before or after execution by the processor 254.

The controller 250 also includes a communication interface 269 coupled to the bus 252. The communication interface 269 provides a two-way data communication coupling to a network link 270 that may be connected to a local network 272. For example, the communication interface 269 may operate in accordance with an internet protocol. As another example, the communication interface 269 may be a local area network (LAN) card allowing a data communication connection to a compatible LAN. Wireless links may also be implemented.

The network link 270 typically provides data communication through one or more networks to other data devices. For example, the network link 270 provides a connection through the local network 272 to a host computer 274 or to data equipment operated by an Internet Service Provider (ISP) 276. The ISP 276 in turn provides data communication services through the worldwide packet data communication network now commonly referred to as the "Internet" 279. The local network 272 and the Internet 279 both use electrical, electromagnetic or optical signals that carry digital data streams. The signals through the various networks and the signals on the network link 270 and through the communication interface 269, which carry the digital data to and from the controller 250 are exemplary forms of carrier waves transporting the information.

In some embodiments, the controller 250 may send messages and receive data, including program code, through the network(s), the network link 270 and the communication interface 269. In the Internet example, a server 290 might transmit a requested code for an application program through the Internet 279, the ISP 276, the local network 272 and the communication interface 269.

The processor 254 may execute the received code as it is received, and/or stored in the storage device 260, or other non-volatile storage for later execution. In this manner, the controller 250 may obtain application code in the form of a carrier wave.

Access devices may include any device capable of interacting with the controller 250 or other service provider. Some exemplary devices may include a mobile phone, a smart phone, a tablet, a netbook, a notebook computer, a laptop computer, a wearable computing or electronic device, a terminal, a kiosk or other type of automated apparatus. Additional exemplary devices may include any device with a processor executing programmable commands to accomplish the steps described herein.

The controller 250 may also be a programmable board such as an Arduino board, and/or one or more of: personal computers, laptops, pad devices, mobile phone devices and workstations located locally or at remote locations, but in communication with the system. System apparatus can include digital electronic circuitry included within computer hardware, firmware, software, or in combinations thereof. Additionally, aspects of the invention can be implemented manually.

Apparatus of the invention can be implemented in a computer program product tangibly embodied in a machine-readable storage device for execution by a programmable processor and method actions can be performed by a programmable processor executing a program of instructions to perform functions of the invention by operating on input data and generating output. The present invention may be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object oriented programming language, or in assembly or machine language if desired, and in any case, the language can be a compiled or interpreted language. Suitable processors include, by way of example, both general and special purpose micro-processors.

Generally, a processor will receive instructions and data from a read-only memory and/or a random-access memory. Generally, a computer will include one or more mass storage devices for storing data files; such devices include magnetic disks, such as internal hard disks and removable disks magneto-optical disks and optical disks. Storage devices suitable for tangibly embodying computer program instructions and data include all forms of non-volatile memory, including, by way of example, semiconductor memory devices, such as EEPROM and flash memory devices; magnetic disks such as, internal hard disks and removable disks; and CD ROM disks. Any of the foregoing can be supplemented by, or incorporated in, ASICs (application-specific integrated circuits).

In some embodiments, implementation of the features of the present invention is accomplished via digital computer utilizing uniquely defined controlling logic, wherein the controller 250 includes an integrated network between and among the various participants in Process Instruments.

The specific hardware configuration used is not particularly critical, so long as the processing power is adequate in terms of memory, information updating, order execution, redemption and issuance. Any number of commercially available database engines may allow for substantial account coverage and expansion. The controlling logic may use a language and compiler consistent with that on a CPU included in the medical device. These selections will be set in accordance with per se well-known conventions in the software community.

Figure 3A:
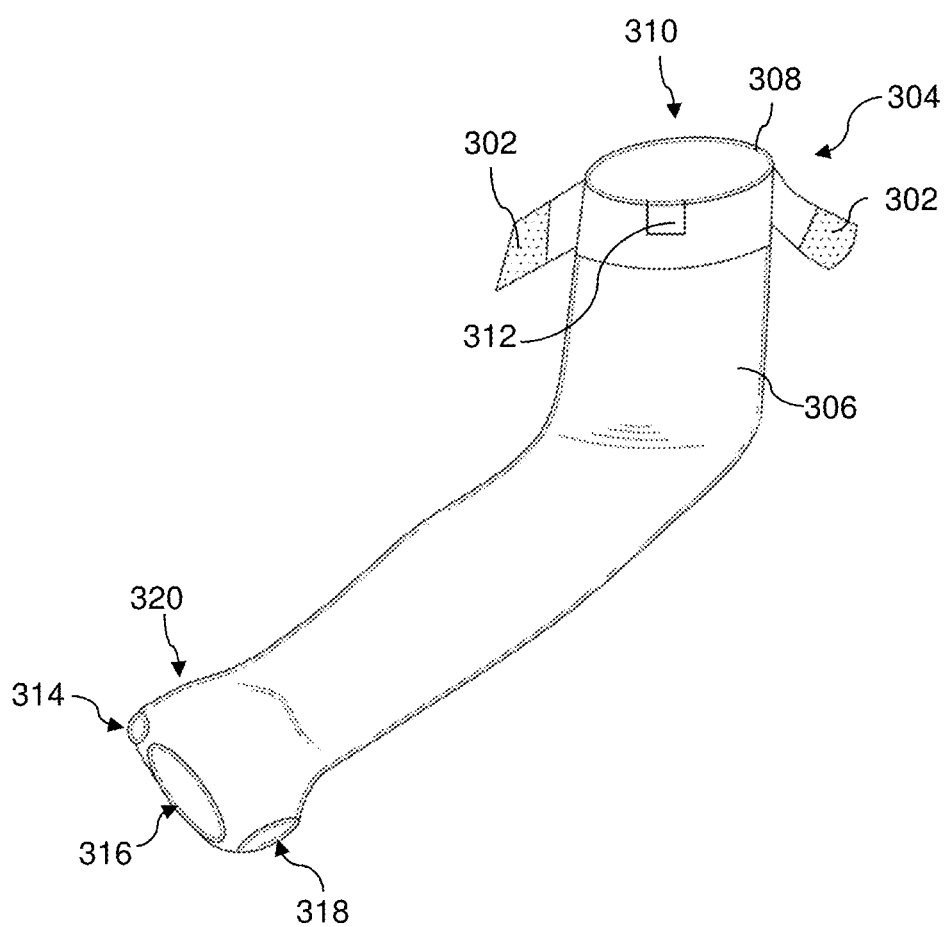
FIG. 3A illustrates a multi-vein arm-sleeve, in accordance with an embodiment of the present disclosure.
Figure 3B:
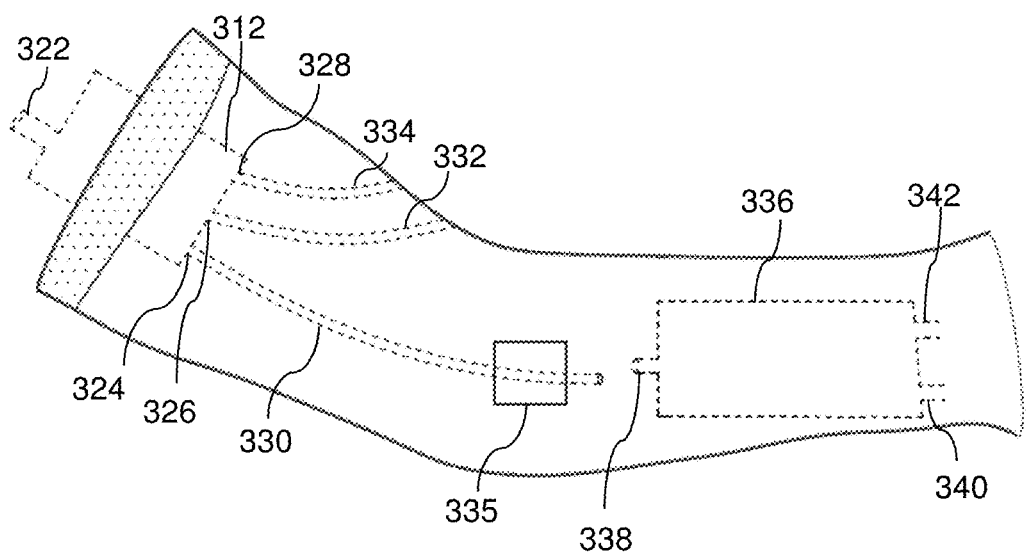
FIG. 3B illustrates a ventral view of a multi-vein arm-sleeve, in accordance with an embodiment of the present disclosure.
Figure 3C:
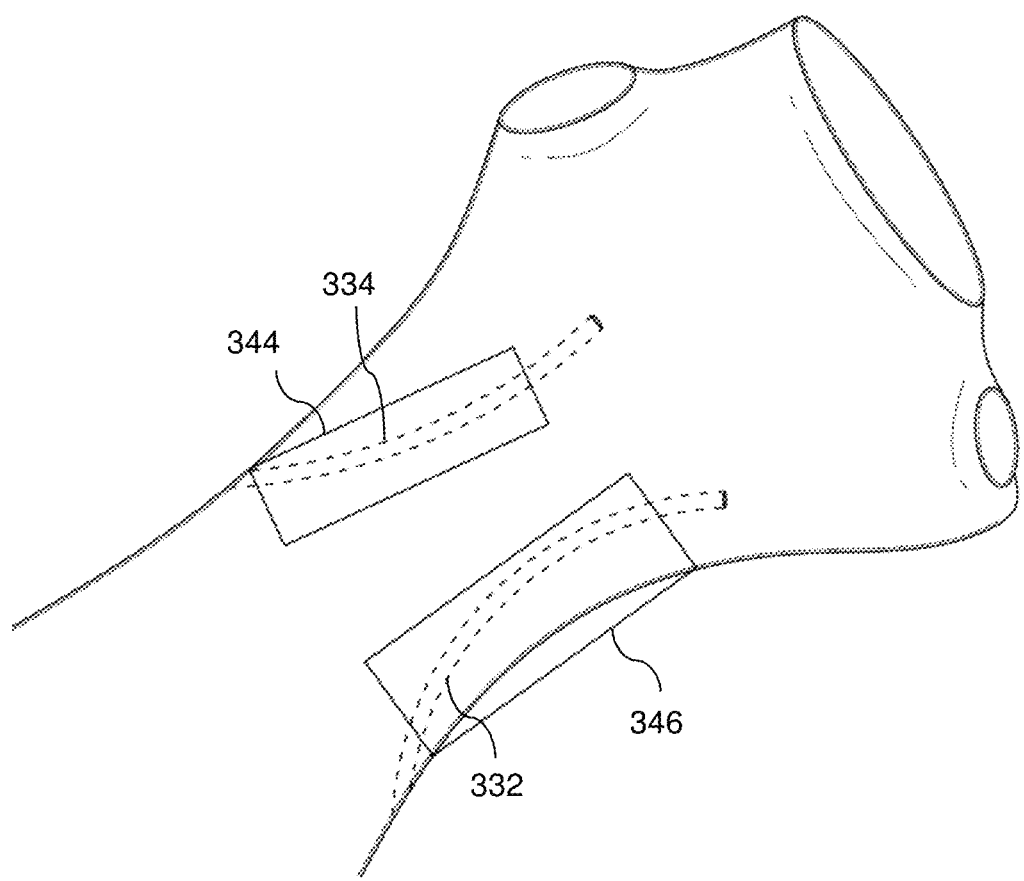
FIG. 3C illustrates a dorsal view of a multi-vein arm-sleeve, in accordance with an embodiment of the present disclosure.

FIGS. 3A, 3B and 3C illustrate various embodiments of a single or multi-vein arm-sleeve 300. As illustrated in FIG. 3A, the single or multi-vein arm-sleeve 300 is configured to be worn by a mammal, robo-pet, or placed on a model of the mammal to simulate various medical procedures such as, but not limited to, veni-puncture, intravenous therapy and so forth. Further, to simulate a variety of options for different clinical situations, multiple venipuncture and intravenous infusion sites are provided. Veni-puncture is the process of obtaining intravenous access for intravenous therapy or for blood sampling of venous blood.

The single or multi-vein arm-sleeve 300 includes an attaching substrate 302 for fixedly attaching the single or multi-vein arm-sleeve 300 to an appendage of the mammal or the model of the mammal. The attaching substrate 302 such as, but not limited to, a removable strap such as Velcro® straps, are provided of the single or multi-vein arm-sleeve 300. The single or multi-vein arm-sleeve 300 includes one or more anatomical replications of an arm, an external layer 306 and an inner layer 308. The external layer 306 may simulate an outer skin of an appendage of the mammal.

The single or multi-vein arm-sleeve 300 further includes one or more conductive layers (not shown). Insertion of a simulated needle or other clinical tool in the one or more conductive layers completes an electrical circuit. Upon completion of the electrical circuit, one or more sensing signals are transmitted to the processor 116 (shown in FIG. 1). The processor 116 may generate a visual representation to accompany actions performed. In some embodiments, the visual representation may include a blood flashback which may be viewed when a procedure is correctly performed. Some embodiments additionally include an audio and/or visual indicator if a procedure is incorrectly performed.

In some embodiments, the external layer 306 may include features of a biological skin such as, but not limited to, puncture pads, self-sealing and multiple-puncture resistant fingertip bags and so forth. Further, external layer 306 may be manufactured from various materials, such as, but not limited to, liquid suspensions, gelatinous substances, elastomers, epoxy resins, metals and textiles, nano-fillers and micro-fillers. Further, the materials can be incorporated in skin models to tune their physical properties. The inner layer 308 of the multi-vein arm-sleeve 300 acts as a puncture resistant barrier. The inner layer 308 prevents the needles or any other surgical tool from passing through and harming the standardized patient or damage the mannequins. The upper edge 304 of the multi-vein arm-sleeve 300 may include an elastic fit. Further, the upper edge 304 may include a blood bag 312 to supply blood to anatomical replications of blood vessels.

The multi-vein arm-sleeve 300 also includes a top opening 310 at the top edge 304 configured to allow the insertion of the appendage of the mammal or the model of the mammal. The multi-vein arm-sleeve 300 may further include a first opening 314 for pinky or little finger, a second opening 316 for index finger, middle finger and ring finger, and a third opening 318 for thumb at a lower edge 320.

FIG. 3B illustrates a ventral view of the multi-vein arm-sleeve 300 including anatomical replications of one or more veins. As illustrated in FIG. 3B, the multi-vein arm-sleeve 300 includes the blood bag 312. The blood bag 312 includes a fill port 322, used to fill the blood bag. Further, the blood bag 312 also includes three output ports 324, 326 and 328 at the bottom of the blood bag 312. The output port 324 leads to an antecubital median cubital vein 330. The median cubital vein 330 is an anatomical replication of a cubital vein, which is a superficial vein of an upper limb. Further, the output ports 326, 328 lead to anatomical replications of a wrist radial vein 332 and a hand basilic vein 334, respectively. The multi-vein arm-sleeve 300 further includes a proper stick area 335. The proper stick area 335 allows the medical practitioner to perform the at least one medical procedure on the one or more anatomical replications of the one or more veins. The multi-vein arm-sleeve 300 further includes an empty bag 336 with three input ports 338, 340 and 342. The three input ports 338, 340 and 342 are configured to receive vein fluid from different locations such as, antecubital area, hand and wrist.

FIG. 3C illustrates a dorsal view of the multi-vein arm-sleeve 300. The multi-vein arm-sleeve 300, includes two proper stick areas 344 and 346. The proper stick area 344 and the proper stick are 346 allow the medical practitioner to interact with and operate on the anatomical replication of the basilic vein 334 and the anatomical replication of the radial vein 332, respectively.

Figure 4A:
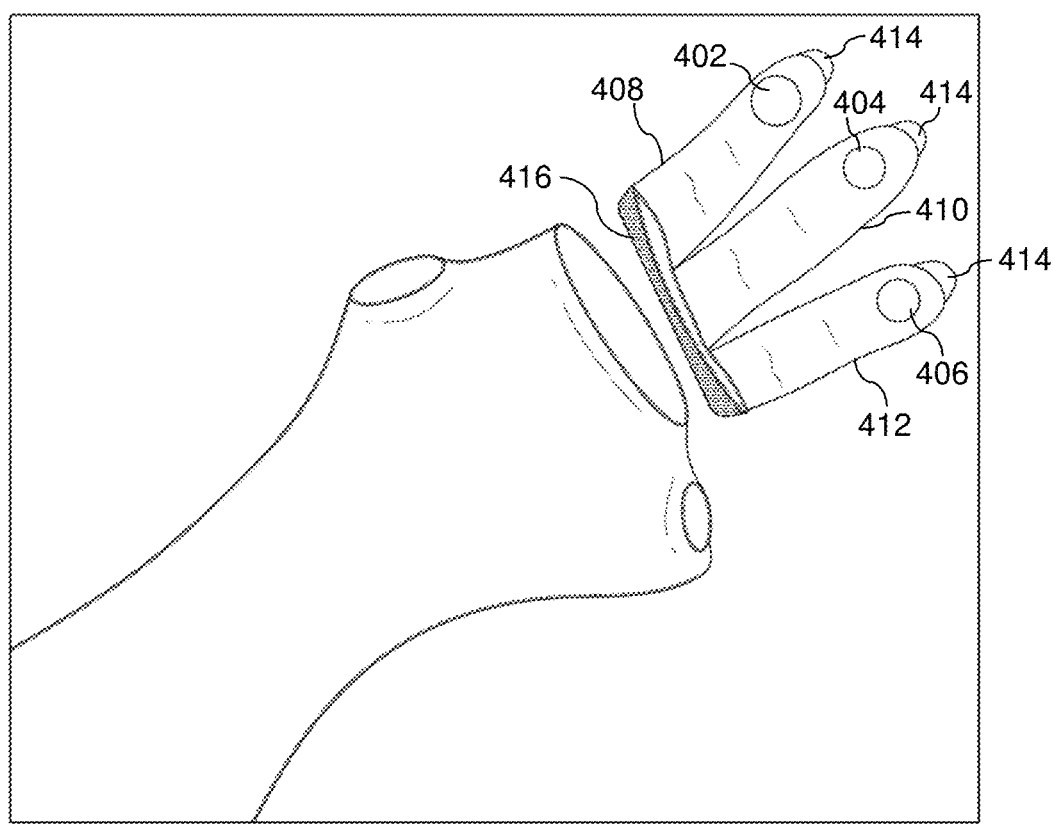
FIGS. 4A and 4B illustrate various embodiments of a three-fingered glove.
Figure 4B:
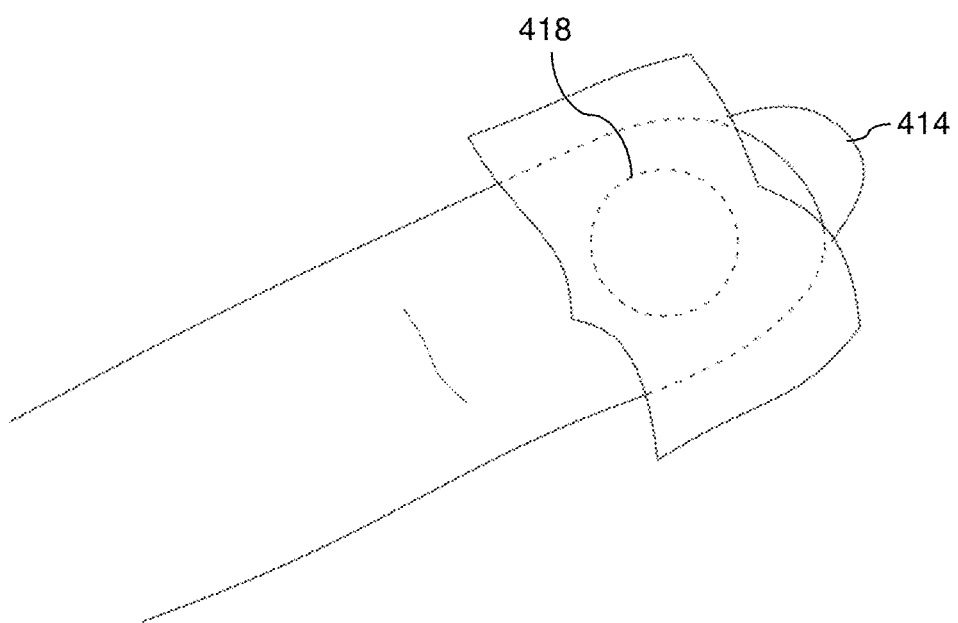

FIGS. 4A and 4B illustrate various embodiments of a three-fingered glove 400 worn by a standardized patient or placed on a mannequin/training arm to simulate the at least one medical procedure such as, but not limited to, finger stick glucose check. The three-fingered glove 400 may provide one or more opportunities to the medical practitioners to practice finger-stick glucose check on standardized patients, holding a person's hand or other bodily interactions, prepping an associated area, performing the puncture, visualizing the fluid to be collected on the testing strip and using a glucose meter, opportunities to improve critical thinking skills by assessment of a person prior to interventions and re-assessment after interventions of the same person; and opportunities for increasing and improving communication opportunities between the standardized patient and student/clinician.

The three-fingered glove 400 includes three target stick zones 402, 404 and 406 on the anatomical replication of an index finger 408, anatomical replication of a middle finger 410 and anatomical replication of a ring finger 412, respectively. Each of the target stick zones 402, 404 and 406 may include a blood bag (not shown in FIG. 4A) to simulate finger stick glucose check. Further, the blood bags of the target stick zones 402, 404 and 406 may contain different control fluids available to simulate multiple ranges of blood sugars representing different clinical situations. The blood bags may be interchangeable between the target stick zones 402, 404 and 406. There are four ranges to provide a variety of realistic situations. A basic version will provide users with the ability to perform routine checks: basic—high, normal, and low blood sugar simulation. Additional options may simulate changes in patient status following actions taken from their plans of care (treatment plan) such as advanced low—clinically dangerous low, improved but still low and normal, advanced high—clinically dangerous high, improved but still high and normal, advanced rebound—clinically dangerously low, dangerously high, normal. Further, each of the index finger 408, the middle finger 410 and the ring finger 412 includes a faux nail 414. The faux nail 414 may be manufactured from materials, such as, but not limited to, plastic, acrylic, polymer, fiber glass and so forth. The three-fingered glove 400 further includes a Velcro® strap 416 (i.e., an attaching substrate) configured to be attached to the multi-vein arm-sleeve 300, described above. However, the three-fingered glove 400 may be attached to any other arm sleeve, sleeve of a clothing, or directly worn over an appendage. Further, the three-fingered glove 400 may include features such as, but not limited to, realistic skin covered puncture pads, faux fingerprints, self-sealing and multiple-puncture resistant fingertip bags, protective puncture-proof material wrapping the fingertip within the glove, and replaceable mini-solution bags with standardized solutions. Further, the three-fingered-glove is configured to be worn on either the left or the right hand.

FIG. 4B illustrates a detailed sectional view of the three-fingered glove shown in FIG. 4A. As illustrated in FIG. 4B, the anatomical replication of the finger includes a blood bag 418 to simulate the finger stick glucose check. In some embodiments, the blood bag 418 may include approximately 5 cubic centimeters of blood.

Figure 5A:
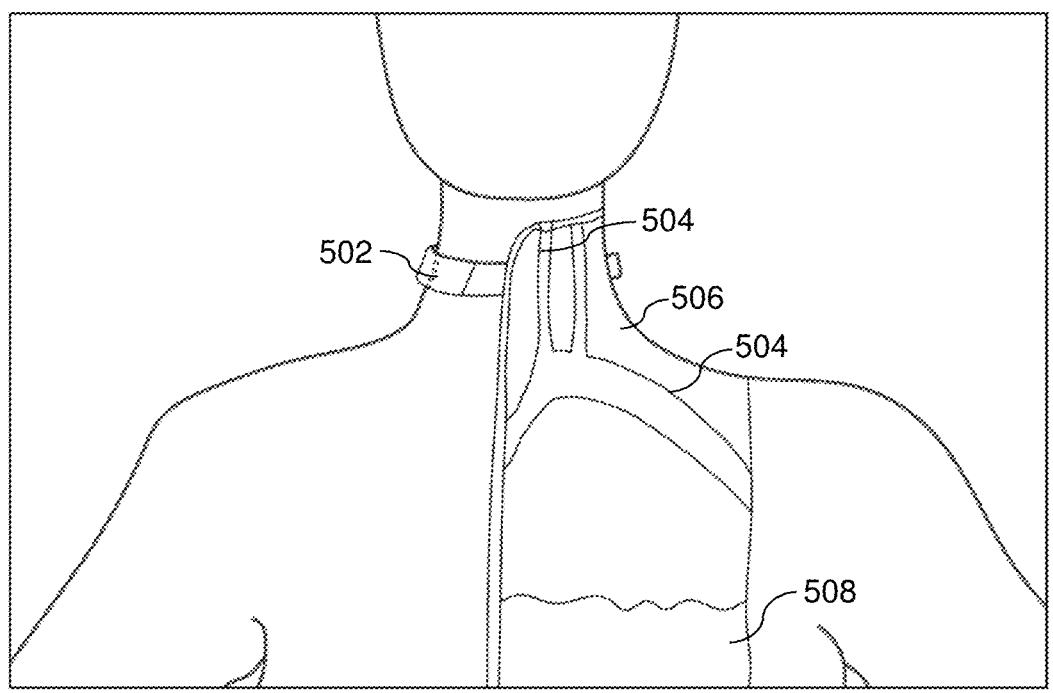
FIGS. 5A-5D illustrate various embodiments of a multi-vessel chest.
Figure 5B:
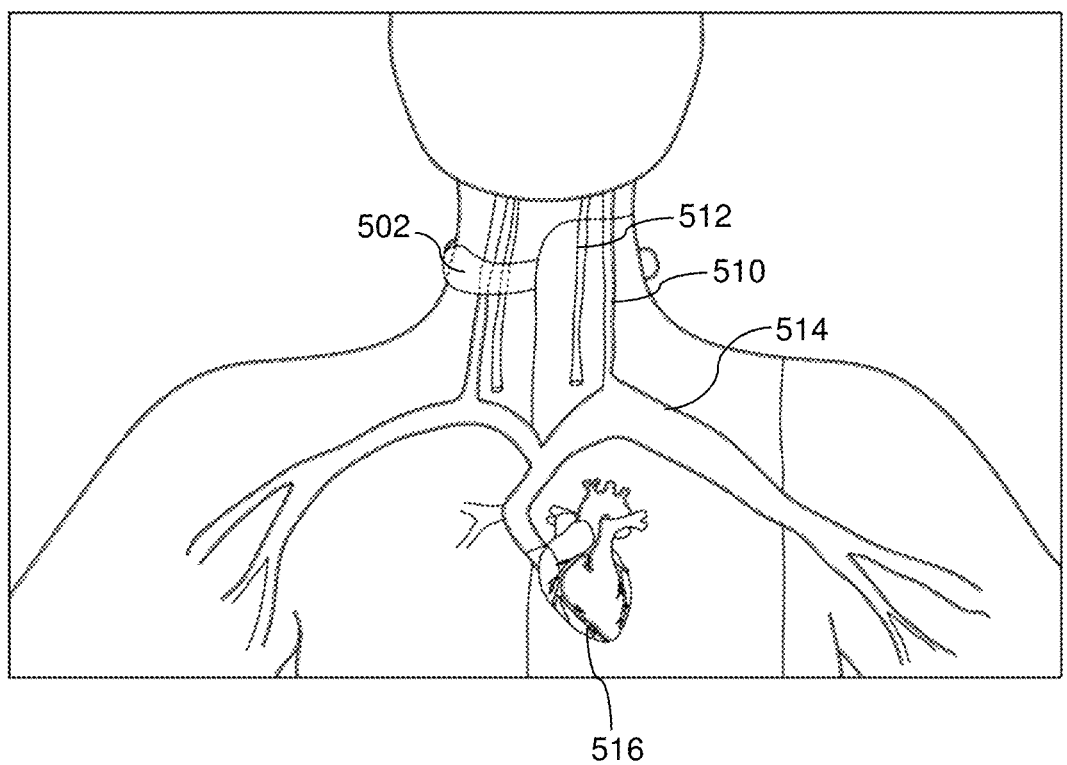
Figure 5C:
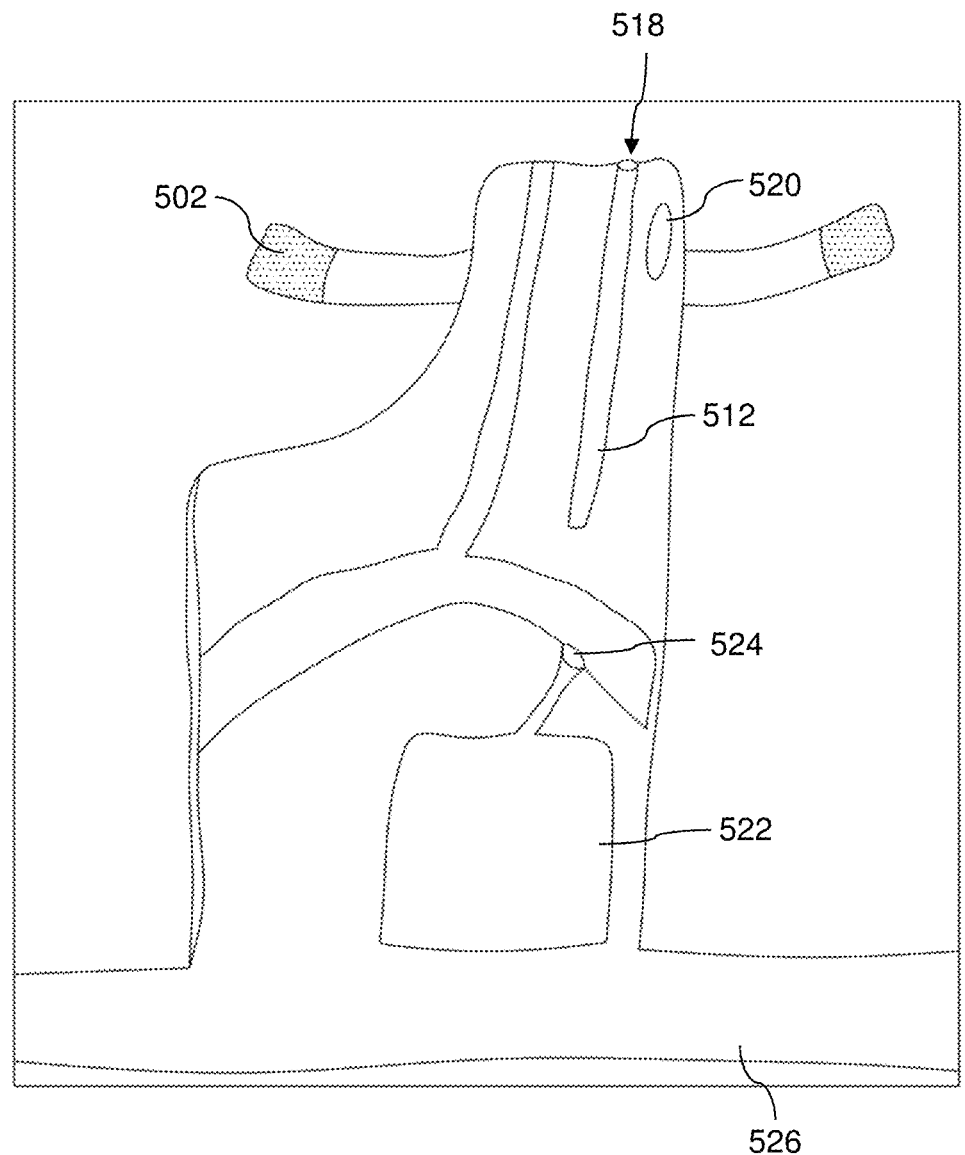

FIGS. 5A, 5B and 5C illustrate various embodiments of a multi-vessel chest 500. The multi-vessel chest 500 may include one or more anatomical replications of an artery, a vein and an organ. As illustrated in FIG. 5A, the multi-vessel chest 500 includes an attaching substrate 502 such as, but not limited to, Velcro® straps. The multi-vessel chest 500 is configured to be worn by a standardized patient and/or a mannequins/training chest and may be sized for an animal or robo-pet. The multi-vessel chest 500 includes anatomical replications of blood vessels 504 which are slightly raised above the multi-vessel chest 500. The slightly raised blood vessels 504 provide a better access to the medical practitioners to perform at least one medical procedure. The blood vessels 504 can be accessed through a punctured region 506. The remaining part of the multi-vessel chest 500 is covered with a non-puncture material 508. The multi-vessel chest 500 is configured to simulate the practice and performance of central line puncture and access.

FIG. 5B illustrates a detailed anatomical view of the multi-vessel chest 500. The multi-vessel chest 500 includes an anatomical replication of an external jugular vein 510, an anatomical replication of carotid artery 512, an anatomical replication of subclavian vein 514 and an anatomical replication of a heart 516. The multi-vessel chest 500 is configured to simulate jugular punctures and central line access. Central line accesses are used for emergency fluid infusion, chemotherapy infusion, administration of specific medications, emergency hemodialysis filtration, and infusion of blood products.

Further, as illustrated in FIG. 5C, the multi-vessel chest may include an opening 518 at the top of the carotid artery 512. The opening 518 is provided to fill the carotid artery 512 with a red fluid to mimic arterial blood. The carotid artery 512 is filled with the red fluid to indicate an incorrect puncture. The multi-vessel chest 500 further includes a pulsating vibrator bullet 520. The pulsating vibrator bullet 520 is configured to mimic the pulsations of a heart. Further, the pulsating vibrator bullet 520 can be activated by a touch of a user. In some embodiments, the multi-vessel chest 500 also includes an empty bag 522 configured to receive intravenous fluid (IV fluid) or flush. IV fluids are fluids which are intended to be administered to a patient intravenously, directly through the circulatory system. The multi-vessel chest 500 also includes a push button 524 on the exterior surface, which is configured to open ports (not shown) of the empty bag 522. Additionally, the multi-vessel chest 500 also includes an abdominal/lower chest Velcro® band 526 (i.e., an attaching substrate) configured to secure the multi-vessel chest 500 to the abdominal of the mammal or the model of the mammal.

Figure 5D:
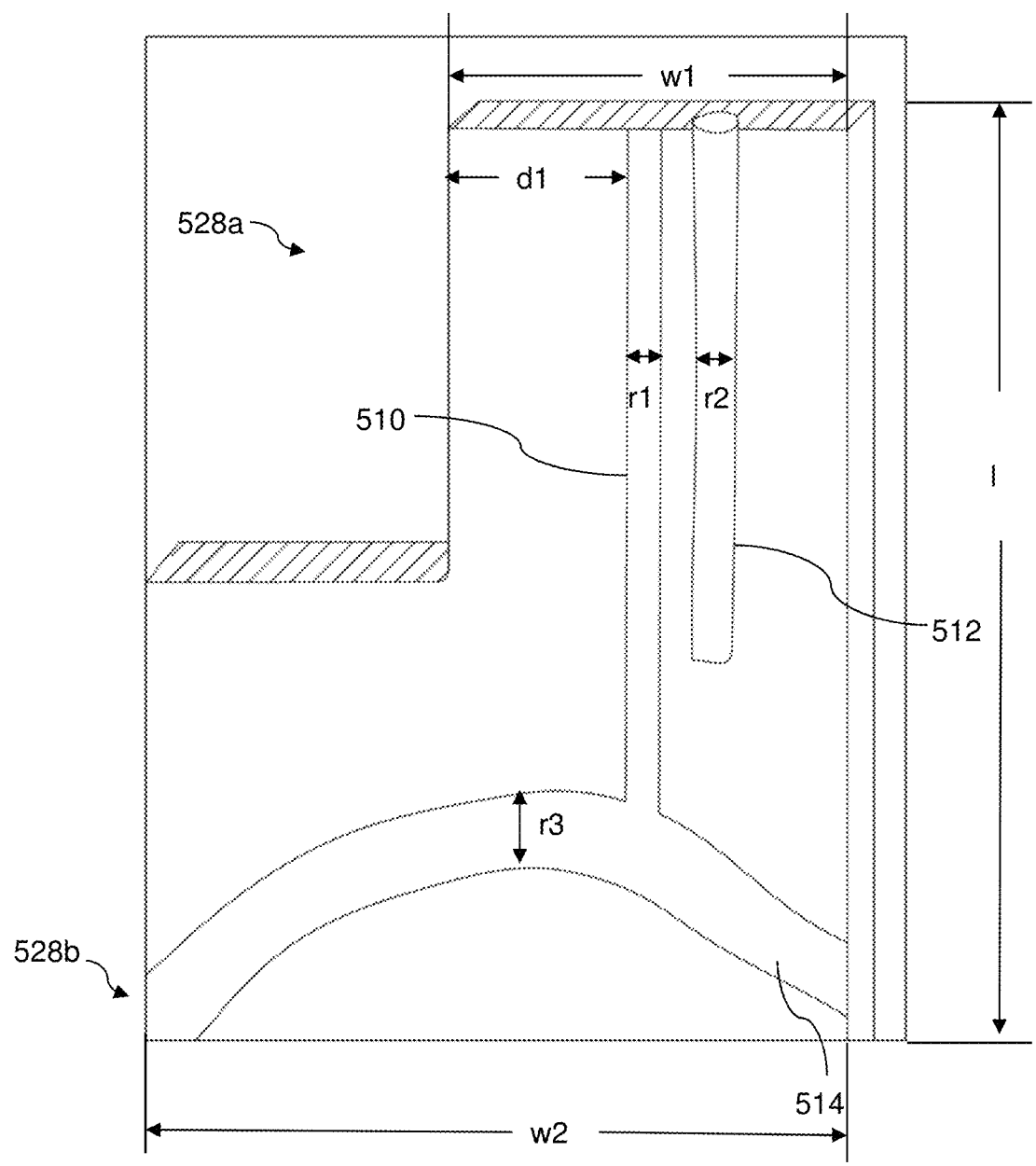

In an exemplary embodiment, as illustrated in FIG. 5D, a top portion 528a of the puncture pad 506 may have a width "w1" and a lower portion 528b of the puncture pad 506 may have a width "w2". The width "w1" and the width "w2" is approximately 12 centimeters and 20 centimeters, respectively. Further, the jugular vein 510 is located at a distance "d" from a left edge of the puncture pad 506. The distance "d1" may be approximately 5.5 centimeters. Further, the jugular vein 510 may have a diameter "r1", which is approximately 1 centimeters. Further, the carotid artery 512 may have a diameter "r2", which is about 1 centimeters. The subclavian vein 514 may have a diameter "r3", which is about 2 centimeters. The puncture pad 506 of the multi-vessel chest 500 may have a total length "l" that can be about 24 centimeters. The various dimensions are provided for exemplary purposes only, and the multi-vessel chest 500 may have any suitable dimensions to simulate various medical procedures.

Figure 6A:
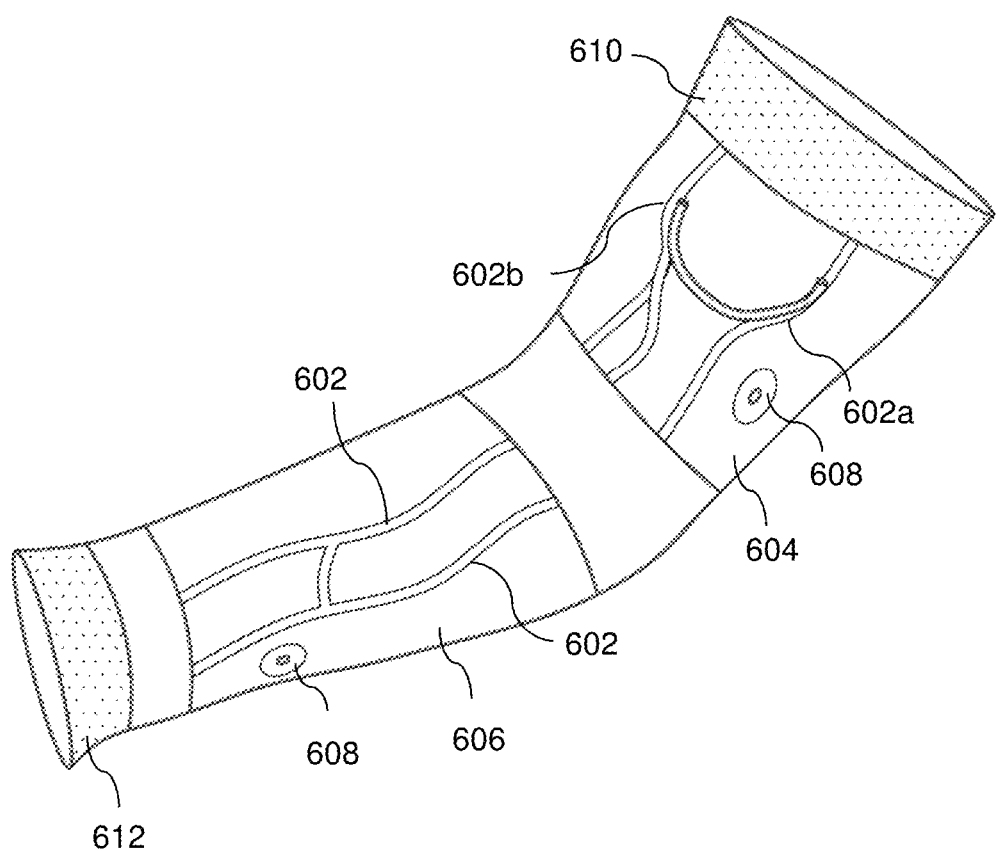
FIG. 6A illustrates an external view of a multi-vessel arm-sleeve, in accordance with an embodiment of the present disclosure.

FIG. 6A illustrates an external view of a multi-vessel arm-sleeve 600. The multi-vessel arm-sleeve 600 includes one or more anatomical replications of one or more blood vessels 602. The multi-vessel arm-sleeve 600 also includes a graft puncture pad 604 and a fistula puncture pad 606. The graft puncture pad 604 and the fistula puncture pad 606 are configured to allow the medical practitioners to perform at least one medical procedure on the one or more blood vessels 602. Further, the one or more blood vessels 602 may include one or more arteries 602a and one or more veins 602b. Moreover, the one or more blood vessels 602 are slightly raised above the graft puncture pad 604 and the fistula puncture pad 606 to provide a better access of the one or more blood vessels 602 to the medical practitioner. In some embodiments, the multi-vessel arm-sleeve 600 is configured to simulate access in dialysis arteriovenous (AV) grafts and fistulas as the at least one medical procedure. The multi-vessel arm-sleeve 600 further includes a pair of touch buttons 608 configured to activate pulsations in the one or more blood vessels 602. The multi-vessel arm-sleeve 600 also includes an upper arm Velcro® strap 610 and a wrist Velcro® strap 612. The upper arm Velcro® strap 610 and the wrist Velcro® strap 612 act as attaching substrates to fixedly attach the multi-vessel arm-sleeve 600 to the mammal or the model of the mammal.

Figure 6B:
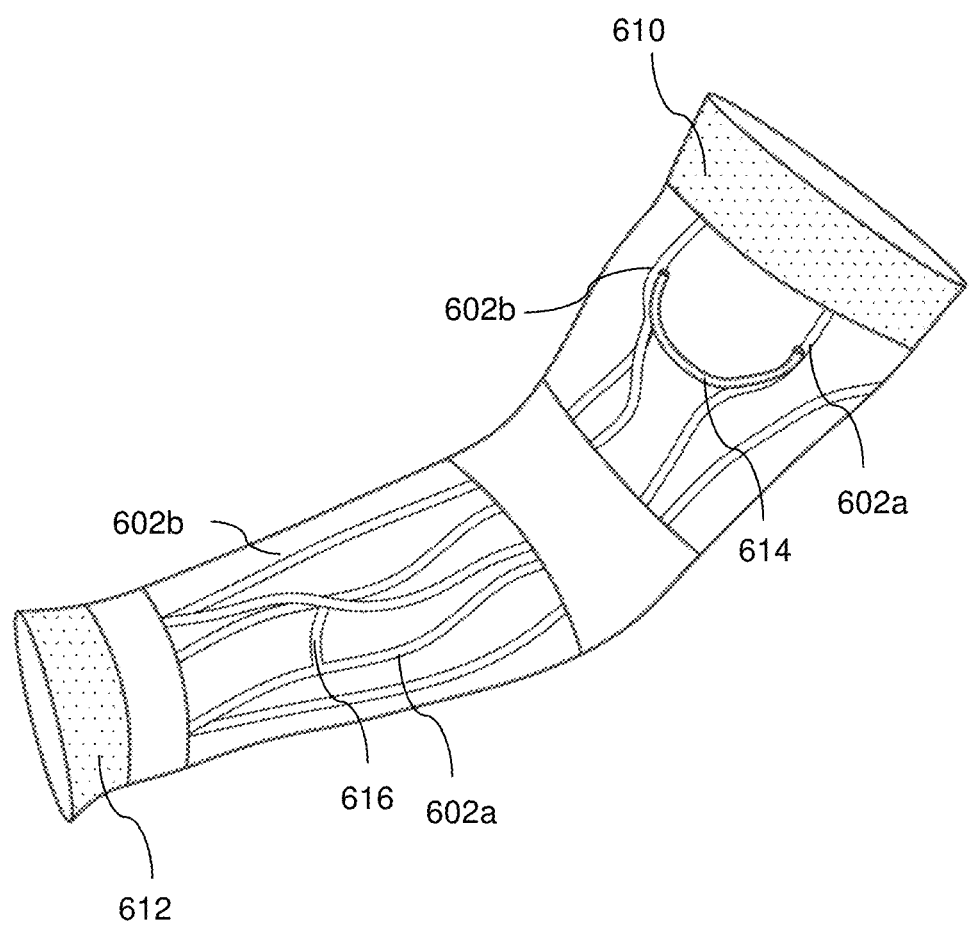
FIG. 6B illustrates an anatomical reference view of a multi-vessel arm-sleeve, in accordance with an embodiment of the present disclosure.

FIG. 6B illustrates an anatomical reference view of the multi-vessel arm-sleeve 600. Further, the multi-vessel arm-sleeve is configured to provide ventral and dorsal access during the various medical procedures. An arteriovenous (AV) graft 614 is created by connecting the anatomical replication of the vein 602b to the anatomical replication of the artery 602a using a soft plastic tube. The AV graft 614 is created to perform hemodialysis by placing two needles, one in the arterial side and one in the venous side of the AV graft 614. In some other embodiments, a fistula 616 is used for hemodialysis. The fistula 616 includes a direct connection of the anatomical replication of the artery 602a to the vein 602b. Further, the fistula 616 is configured to become a natural part of the body after completely manufactured. In an exemplary embodiment, the completely manufactured fistula 616 is used to perform hemodialysis as the completely manufactured fistula 616 is bigger and stronger to provide an access with good blood flow that can last for a long period (e.g., decades). In some embodiments, the fistula 616 requires weeks to months to get mature and ready to be used for hemodialysis.

In an alternate embodiment, the multi-vessel arm-sleeve 600 can be used in combination with the three-fingered glove 400 (as shown in FIG. 4a) to allow the student or the medical practitioner to switch from a basic diagnostic finger-stick to a more complex diagnosis and intervention/treatment.

In some other embodiments, the multi-vessel arm-sleeve 600 is configured to provide one or more of opportunities, such as, but not limited to, explaining the procedure to a person, holding a person's hand or arm, prepping the area, performing the access, visualizing the fluid to indicate proper access, collection of blood specimen, and connection to the dialysis tubing to the student or the medical practitioners. The multi-vessel arm-sleeve 600 further mimics the physical property of the biological arm such as, but not limited to, self-sealing puncture-resistant vessels, puncture-proof underside to prevent injury, realistic puncture resistant skin, and easy access site to refill fluids. Further, the multi-vessel arm-sleeve 600 can be used with standardized patients and/or be placed on a mannequin or training arm to enhance the simulated experience.

Figure 7A:
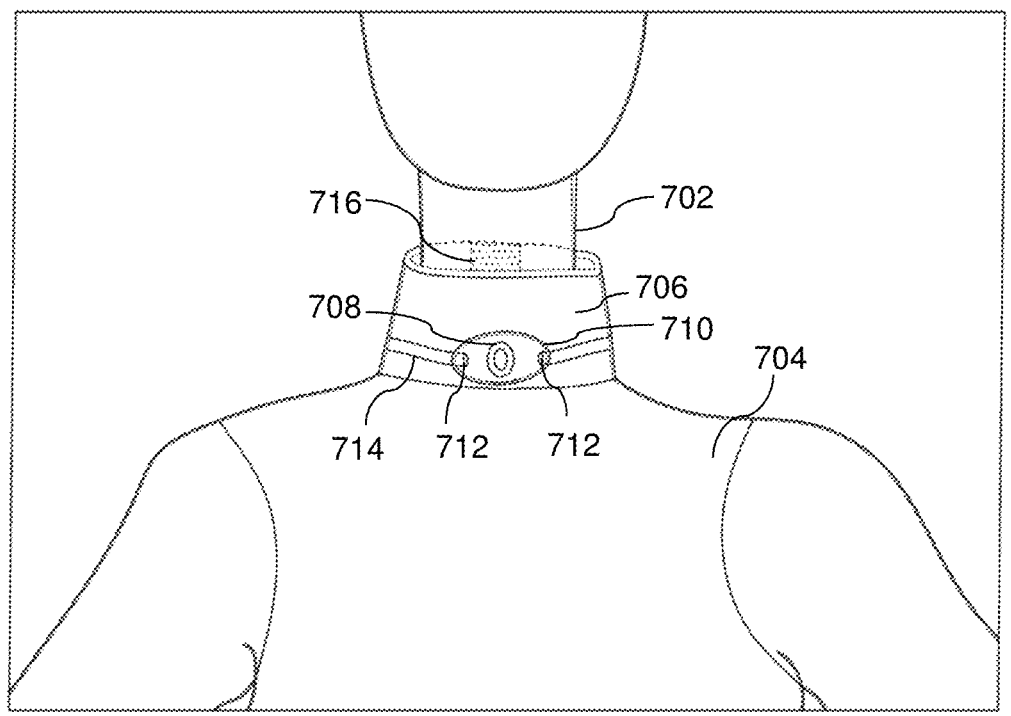
FIG. 7A illustrates an external view of a bib-style device, in accordance with an embodiment of the present disclosure.

FIG. 7A illustrates an external view of a bib-style device 700 configured to be worn around a neck 702 of the mammal or the model of the mammal. The bib-style device 700 may include a bib 704, configured to at least partly cover a torso of the mammal or the model of the mammal. The bib-style device 700 further includes a collar 706 connected with the bib 704. The collar 706 includes a stoma 708. The stoma 708 is a surgically created opening through the neck 702 into the trachea (not shown in FIG. 7A) to allow direct access to the breathing tube (not shown in FIG. 7A). In some embodiments, the bib-style device 700 may also include a neck plate 710 configured to support a tracheostomy device (not shown in FIG. 7A). The neck plate 710 may further include a pair of holes 712 configured to attach a cloth tie 714 around the neck 702. The bib-style device 700 further includes a Velcro® strap 716 (i.e., an attaching substrate) at an inner side of the collar 706 to fixedly attached the bib-style device 700 to the mammal or the model of the mammal. Further, the collar 706 is provided with a pre-molded support under the stoma 708. In an exemplary embodiment, the width of the bib 704 is approximately 30 centimeters across the chest and the length of the bib 704 is about 30 centimeters. The dimensions of the bib 704 are exemplary in nature, the bib-style device 700 may have any suitable dimensions as per requirements.

Figure 7B:
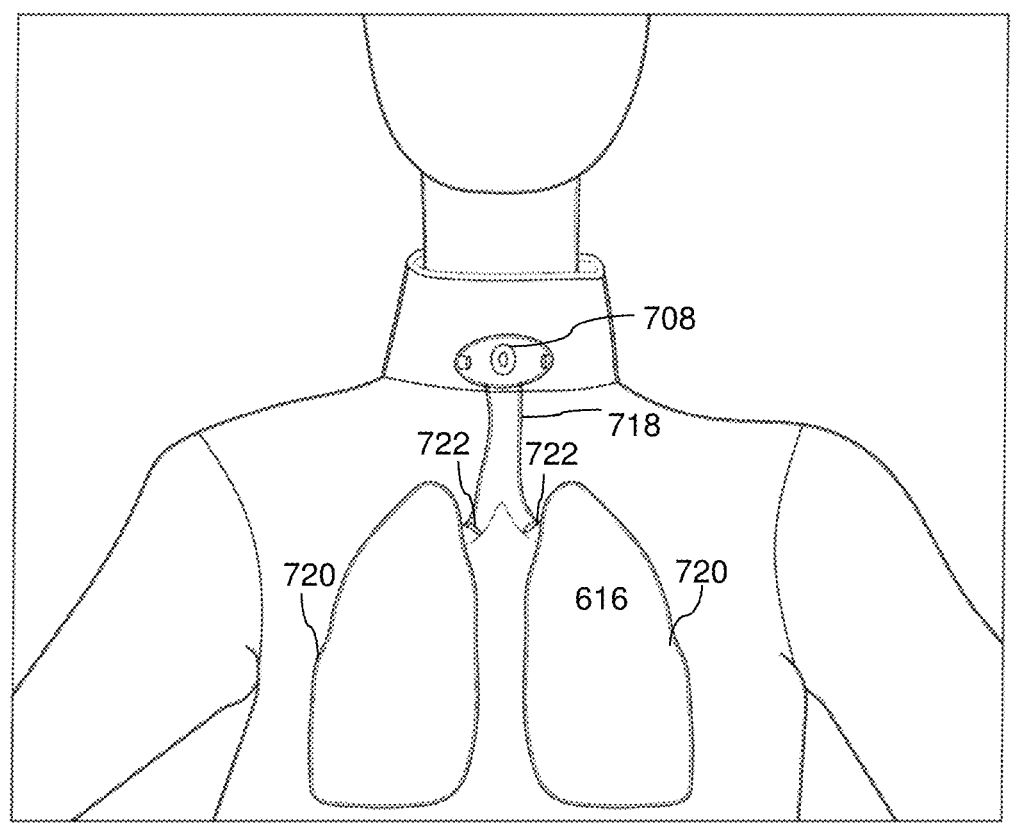
FIG. 7B, illustrates an under-chest flap view of a bib-style device, in accordance with an embodiment of the present disclosure.

FIG. 7B illustrates an under-chest flap view of the bib-style device 700. The bib-style device 700 may include anatomical replications of one or more truncal tissues, such as a skin of the chest. In some embodiments, the bib-style device 700 is configured to include anatomical replications of a trachea 718 and a pair of lungs 720. A top end of the anatomical replication of the trachea 718 is fixedly attached with the stoma 708 by any fastening means such as, but not limited to, screws, adhesives and so forth. Further, a bottom end of the anatomical replication of the trachea 718 is divided into two parts for attachment with the anatomical replications of the pair of lungs 720. Further, the bib-style device 700 includes a pair of clamps 722 at the bottom ends of the trachea 718 to hold the pair of lungs 720.

Figure 8:
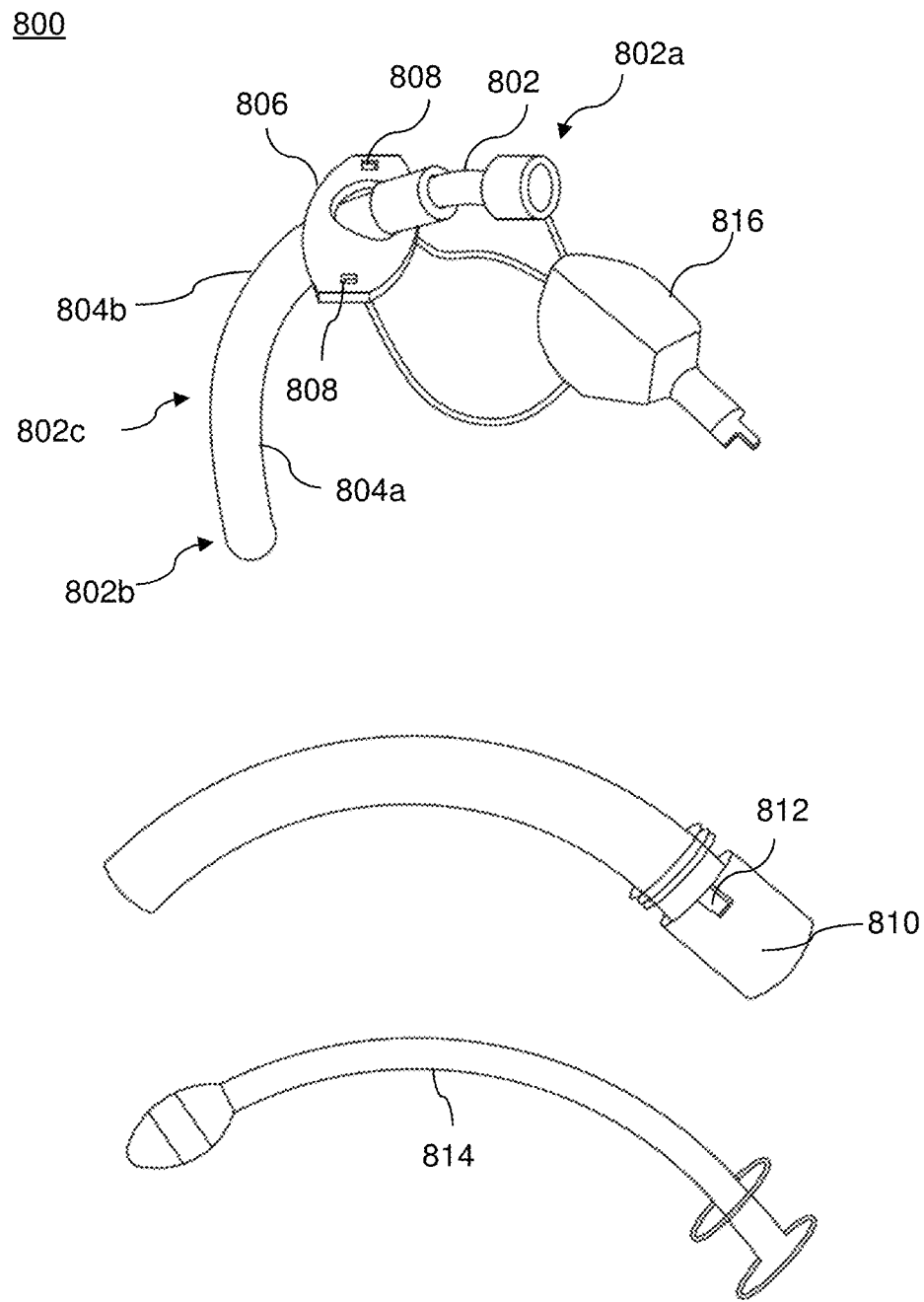
FIG. 8, illustrates a tracheostomy device, in accordance with an embodiment of the present disclosure.

FIG. 8 illustrates a tracheostomy device 800 used to perform tracheostomy on the bib-style device 700 (as shown in FIG. 7A). Further, the stoma 708 (as shown in FIG. 7A) accommodates the tracheostomy device 800 which includes an outer cannula 802, an inner cannula 810, an obturator 814 and an inflatable bag 816. The outer cannula 802 is configured to be at least partly received within the stoma 708. Further, the outer cannula 802 is the outer tube that holds the tracheostomy open. The outer cannula 802 may include a distal end 802a, a proximal end 802b, and a lumen 802c extending between the distal and proximal ends 802a, 802b. The lumen 802c may include a horizontal section 804a and a section 804b having a general curvature designed to fit through the stoma 708 and into the trachea 718 (as shown in FIG. 7B) of the bib-style device 700. In some embodiments, the outer cannula 802 is made of metal such as, but not limited to, silver, stainless steel, and the like. In some other embodiments, the outer cannula 802 is made of plastic material such as, but not limited to, silicone, polyvinyl chloride and the like. Furthermore, the outer cannula 802 can be adapted to connect to ventilation systems. The outer cannula 802 may also include a flange or a neck plate 806 on the proximate end 802a. The neck plate or the flange 806 extends from the sides of the outer tube and has holes 808 for attachment with cloth ties or a Velcro® strap around the neck. Further, the neck plate or the flange 806 is configured to stabilize the outer cannula 802 outside a patient's body. The inner cannula 810 fits inside the outer cannula 802. The inner cannula 810 may include a lock 812 to keep the inner cannula 810 from being coughed out. Further, the inner cannula 810 is configured to be removed for cleaning. The obturator 814 is configured to be received within the inner cannula 810. The obturator 814 is further configured to guide a tracheostomy tube (not shown) within the stoma 708. The obturator 814 fits inside the inner cannula 810 to provide a smooth surface that guides the tracheostomy tube. An inflatable balloon 816 is also provided at the distal end of the outer cannula. The inflatable balloon 816 can be inflated to protect the airway.

Figure 9A:
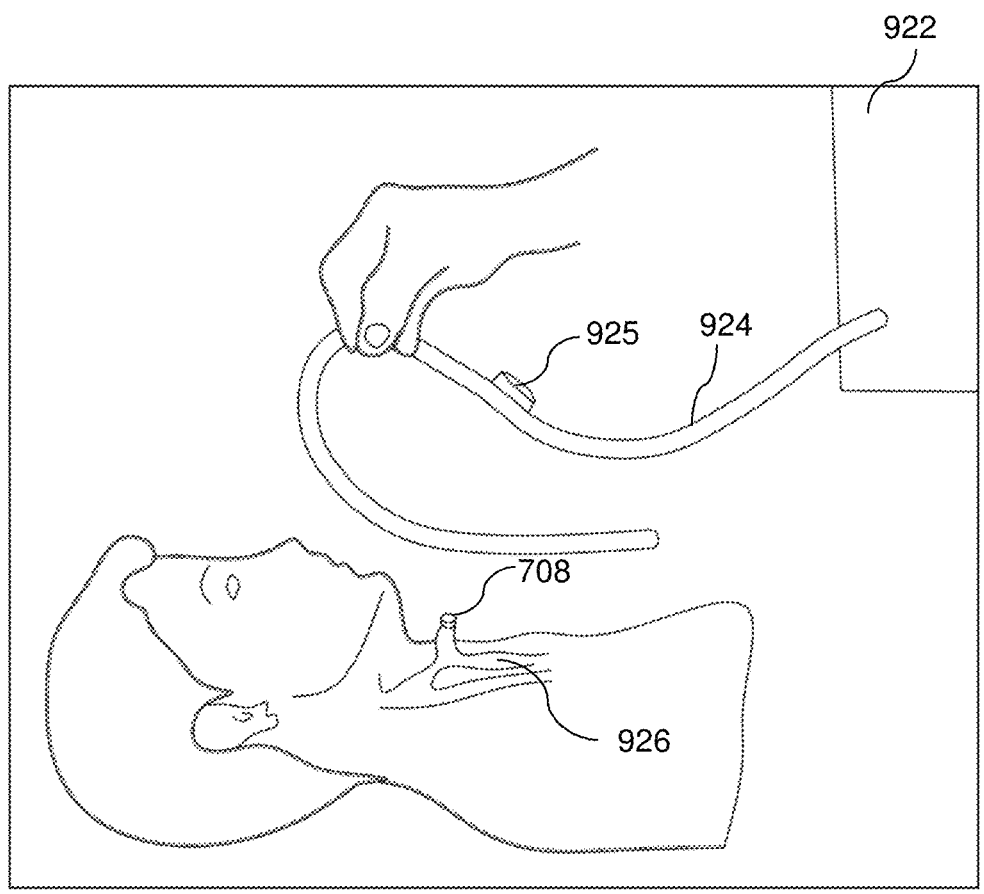
FIGS. 9A, 9B and 9C illustrate various aspects of a medical procedure.
Figure 9B:
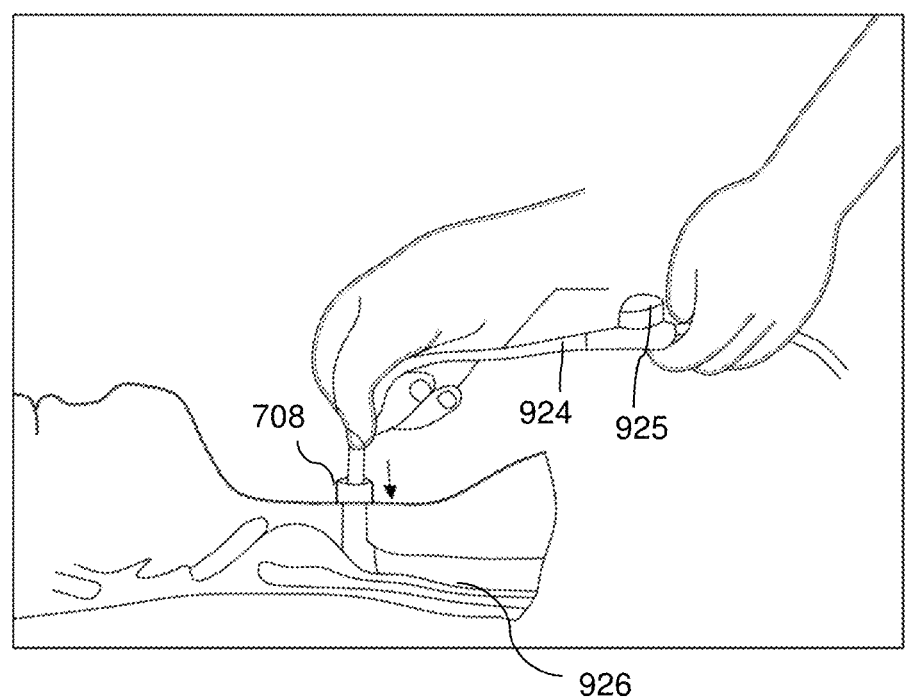
Figure 9C:
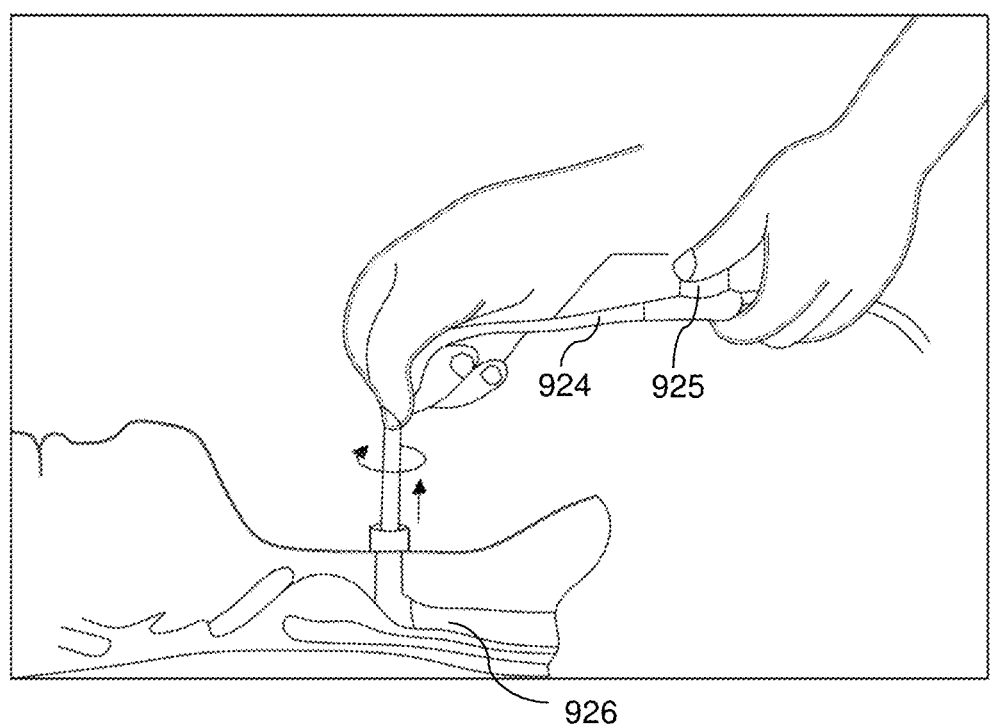

FIGS. 9A, 9B and 9C illustrate a medical procedure 900 pertaining to tracheostomy cleaning performed on the bib-style device 700 (as shown in FIG. 7A). As the medical procedure 900 is performed on the bib-style device 700, similar parts are provided with corresponding reference numerals. The medical procedure 900 involves a suction machine 922 and a catheter 924. The catheter 924 is configured to be attached to the suction machine 922 to simulate the medical procedure 900. Further, the catheter also includes a hole 925 to apply suction. As illustrated in FIG. 9B, the catheter 924 is inserted within a trachea tube 926 to a proper distance through the stoma 708. In some embodiments, the distance is approximately calculated as the length of trachea tube plus 0.25 inch. As illustrated in FIG. 9C, suction is applied by the medical practitioner by putting a thumb over the hole 925. Subsequently, the catheter 924 is pulled out gently by rolling the catheter 924 between a thumb and a fore finger.

Figure 10A:
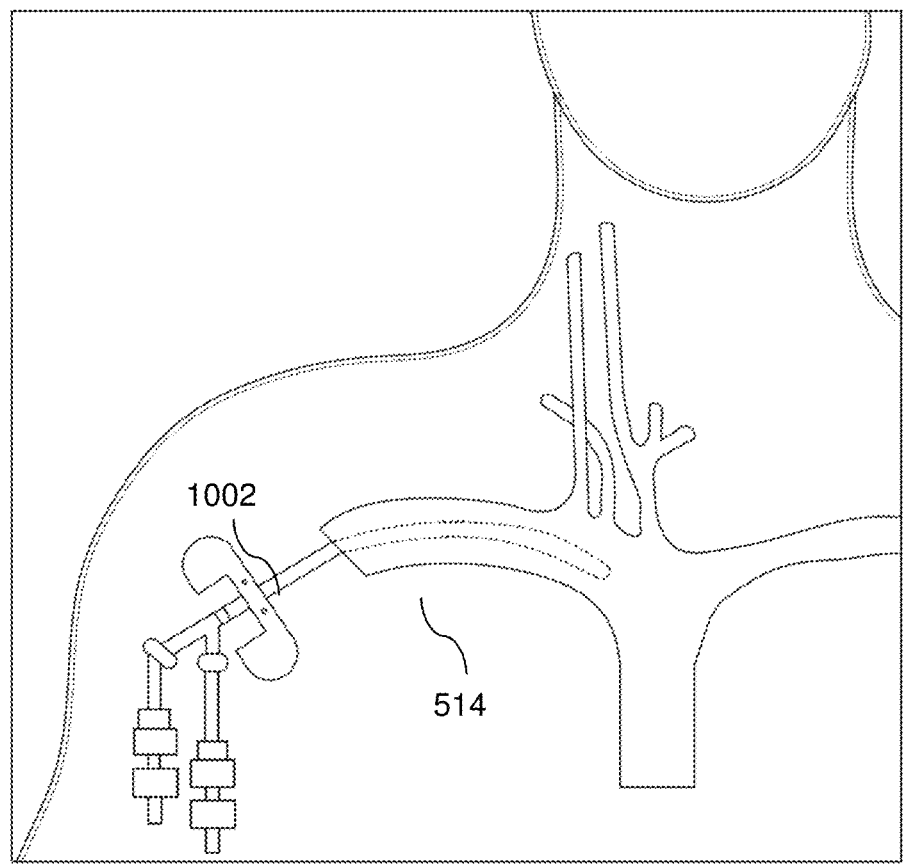
FIGS. 10A and 10B illustrate various aspects of another medical procedure.
Figure 10B:
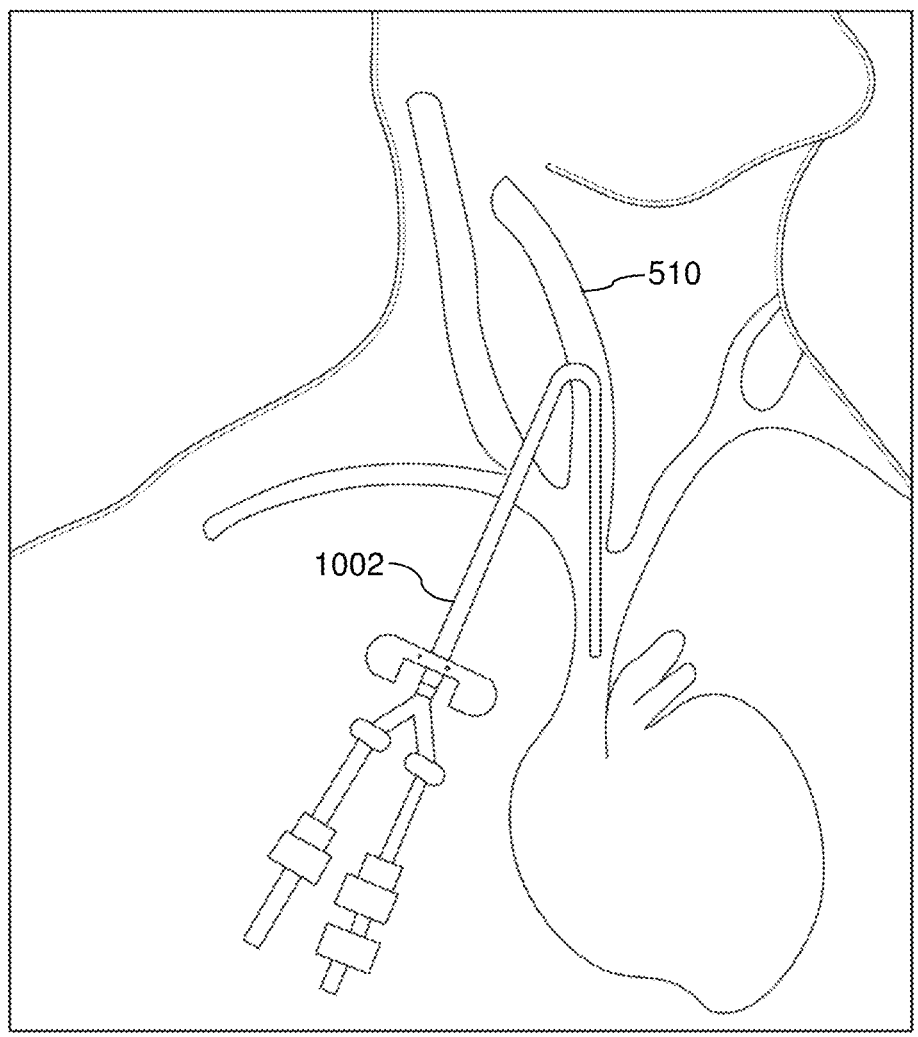

FIGS. 10A and 10B illustrate one or more medical procedures performed on the multi-vessel chest 500 (shown in FIG. 5A). As illustrated in FIG. 10A, a catheter 1002 is inserted into the anatomical replication of the subclavian vein 514 (shown in FIG. 5B). The catheter 1002 is coated with antibiotics or a combination of chlorhexidine and silver sulfadiazine to prevent infectious complications. Further, the catheter 1002 is inserted into the subclavian vein 514 at a specific site, which is selected based on the one or more actions of the at least one medical procedure. Further, the catheter 1002 is configured to be fixed at the specific site by use of suture, staplers, tapes and so forth.

FIG. 10B illustrates the insertion of the catheter 1002 in the jugular vein 510. Further, central line accesses using the catheters 1002 are used for emergency fluid infusion, chemotherapy infusion, administration of specific medications, emergency hemodialysis filtration, and infusion of blood products.

Figure 11:
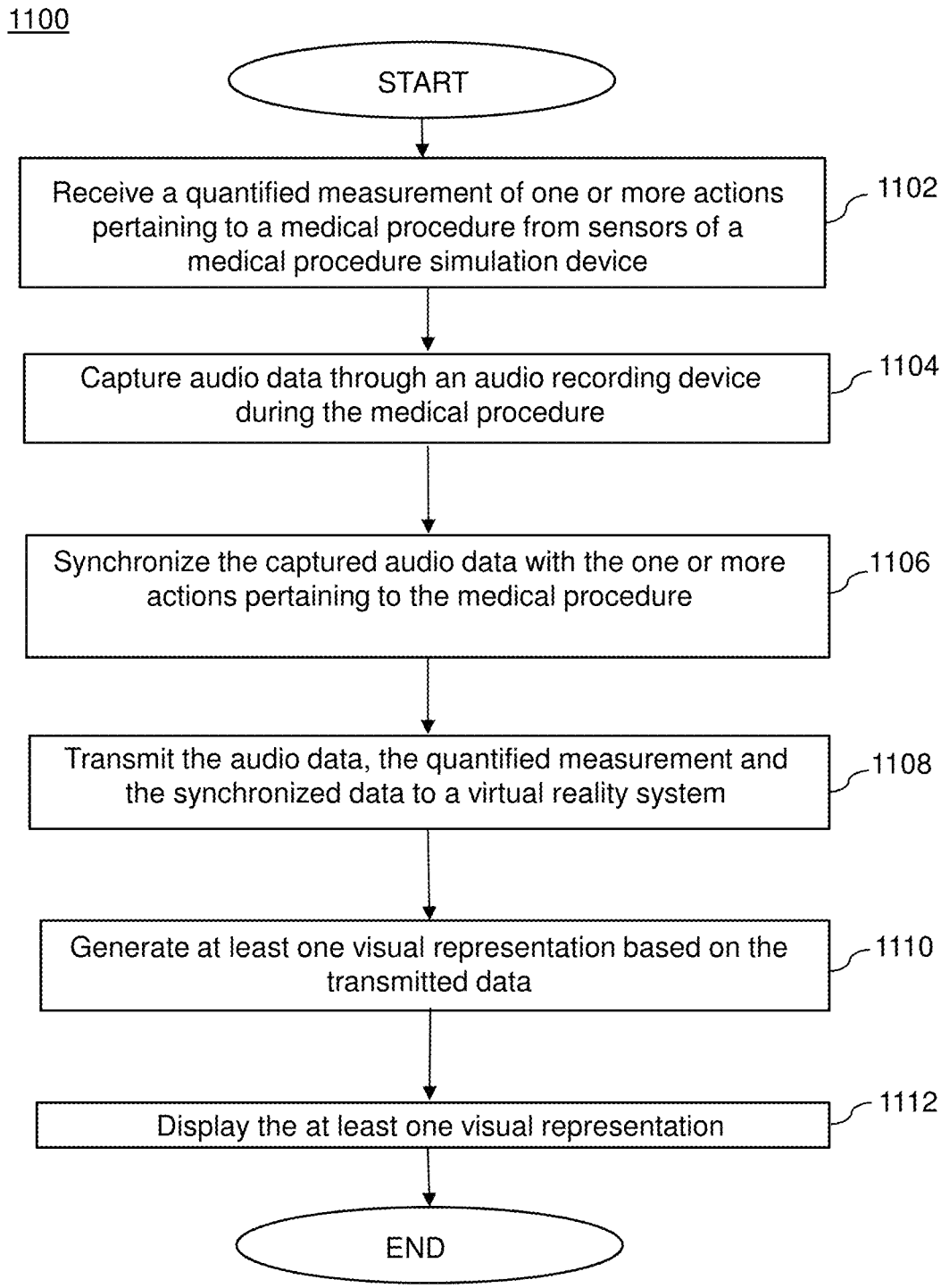
FIG. 11 is a flowchart illustrating a method for simulating a medical procedure, in accordance with an embodiment of the present disclosure.

FIG. 11 is a flowchart of a method 1100 for the simulation of a medical procedure to be performed on the simulated body part 102. The simulated body part 102, as shown in FIG. 1, can be representative of any of the multi-vein arm-sleeve 300 (shown in FIGS. 3A, 3B and 3C), the three-fingered glove 400 (shown in FIGS. 4A and 4B), the multi-vessel chest 500 (shown in FIGS. 5A, 5B and 5C), the multi-vessel arm-sleeve 600 (shown in FIGS. 6A and 6B), the bib-style device 700 (shown in FIGS. 7A and 7B) or any other simulated mammalian body part. The simulated body part 102 includes anatomical replications of the one or more tissues 104. The tissues 104 are sized, shaped, and formed of a suitable material to mimic the anatomy of the mammalian body part that the simulated body part 102 represents. The simulated body part 102 is attached fixedly to any of a standardized patient or a training mannequin using an attaching mechanism such as, but not limited to, a Velcro® strap, a belt with a buckle and so forth.

At step 1102, the timing device 110 receives a quantified measurement of one or more actions pertaining to a medical procedure from the sensor 106 of the medical procedure simulation device 100. The sensors 106 may provide a quantified measurement of the medical procedure such as, location of a procedure, a pressure, a temperature, removal or insertion of fluid, a time required to execute the procedure or other variables that are useful to determine a level of proficiency demonstrated by the practitioner or learner while performing the procedure.

At step 1104, the audio recording device 108 captures audio data during the medical procedure. In some embodiments, the audio data may pertain to an action being performed by a practitioner and a rationale with taking the action. In other embodiments, the audio data may be directed to voice recitations captured using the audio recording device 108. In some embodiments, combination of the data collected through the sensors 106 and the audio data may indicate whether a proper procedure was followed. Alternatively, the simulated body part 102 may include one or more audio recording device(s) 108 to memorialize or record the practitioner/patient interaction.

At step 1106, the timing device 110 is configured to measure the elapsed time intervals in hours, minutes, seconds, and/or fractions of a second during the medical procedure. Further, the timing device 110 is configured to synchronize the audio data captured using the audio recording device 108 with any action pertaining to the medical procedure. Time stamps of the instants at which the action is detected by the sensors 106 or the instants at which quantified measurements of the action are generated by the sensors 106 are extracted from the time intervals measured by the timing device 110 and applied to the audio data such that the appropriate portions of audio data are tuned to the corresponding action of the medical procedure.

At step 1108, the audio data captured using the audio recording device 108, the quantified measurement, and the synchronized data may be communicated to a virtual reality system 112 using a communication interface 114.

At step 1110, the processor 116 of the virtual reality system 112 is configured to generate at least one visual representation of the medical procedure based on the audio data captured using the audio recording device 108, the data captured using the sensors 106, and the synchronized data by the timing device 110 received at the communication interface 114. In some embodiments, the processor 116 may execute a program code received, and/or stored in a memory device, or other non-volatile memory for the generation of the at least one visual representation. The program code is a set of instructions or statements providing instructions for the operation of the processor 116 to generate the at least one visual representation of the medical procedure. Audio data pertaining to the medical procedure is synchronized with the time stamps of the instants at which the sensors 106 provided quantified measurements. The processor 116 receives various signals from the sensors 106 and accordingly determines appropriate response indicators corresponding to the various signals. The response indicators can be any or a combination of, changes in the color of the blood vessels 504, deflation of the anatomical replications and the like. The response indicators are embedded in the at least one visual representation of the medical procedure.

In some embodiments, the visual representation of the medical procedure is a moving picture or video that plays with the embedded response indicators at the time stamps of the instants at which the sensors 106 provided the quantified measurements. The moving picture or video can be played with the synchronized data from the timing device 110. Alternatively, the visual representation can be a series of still images of the medical procedure embedded with the time stamps and corresponding response indicators.

For example, in FIG. 5C, one or more pressure sensors in the multi-vessel chest 500 are configured to provide a quantified measurement of an action that includes a puncture to the carotid artery 512. The carotid artery 512 is filled with the red fluid to indicate the puncture. The pulsating vibrator bullet 520 is configured to mimic a faster rate of heart pulsations. Therefore, the responses to the puncture include overflow of red fluid (blood) and increased heart pulsations. The timestamp of the instant at which a quantified measurement is generated by the one or more pressure sensors and the timestamp at which the heart pulsates rapidly are both recorded by the timing device 110. Audio data pertaining to the medical procedure is synchronized with the recorded timestamps and the puncture. The synchronized data, the quantified measurements and the audio data are transmitted to the virtual reality system 112 through the communication interface 114. The processor 116 determines response indicators based on the response of the puncture. A response indicator to the filling of the red fluid may be a color change in the carotid artery and the response indicator to the faster pulsations could be the generation of sounds mimicking a faster heartbeat. Both response indicators are embedded in a visual representation of the medical procedure. The visual representation can be a series of two-dimensional or three-dimensional images that may be still or moving. The response indicators are synchronized with the audio data and the time stamps.

Such response indicators may be apparent in each of the multi-vein arm-sleeve 300 (shown in FIGS. 3A, 3B and 3C), the three-fingered glove 400 (shown in FIGS. 4A and 4B), the multi-vessel arm-sleeve 600 (shown in FIGS. 6A and 6B) and the bib-style device 700 (shown in FIGS. 7A and 7B).

At step 1112. the display 120 is configured to display the visual representation of the medical procedure generated by the processor 116 in various dimensions such as, but not limited to, two-Dimensional (2D), three-dimensional (3D) and so forth.

Figure 12:
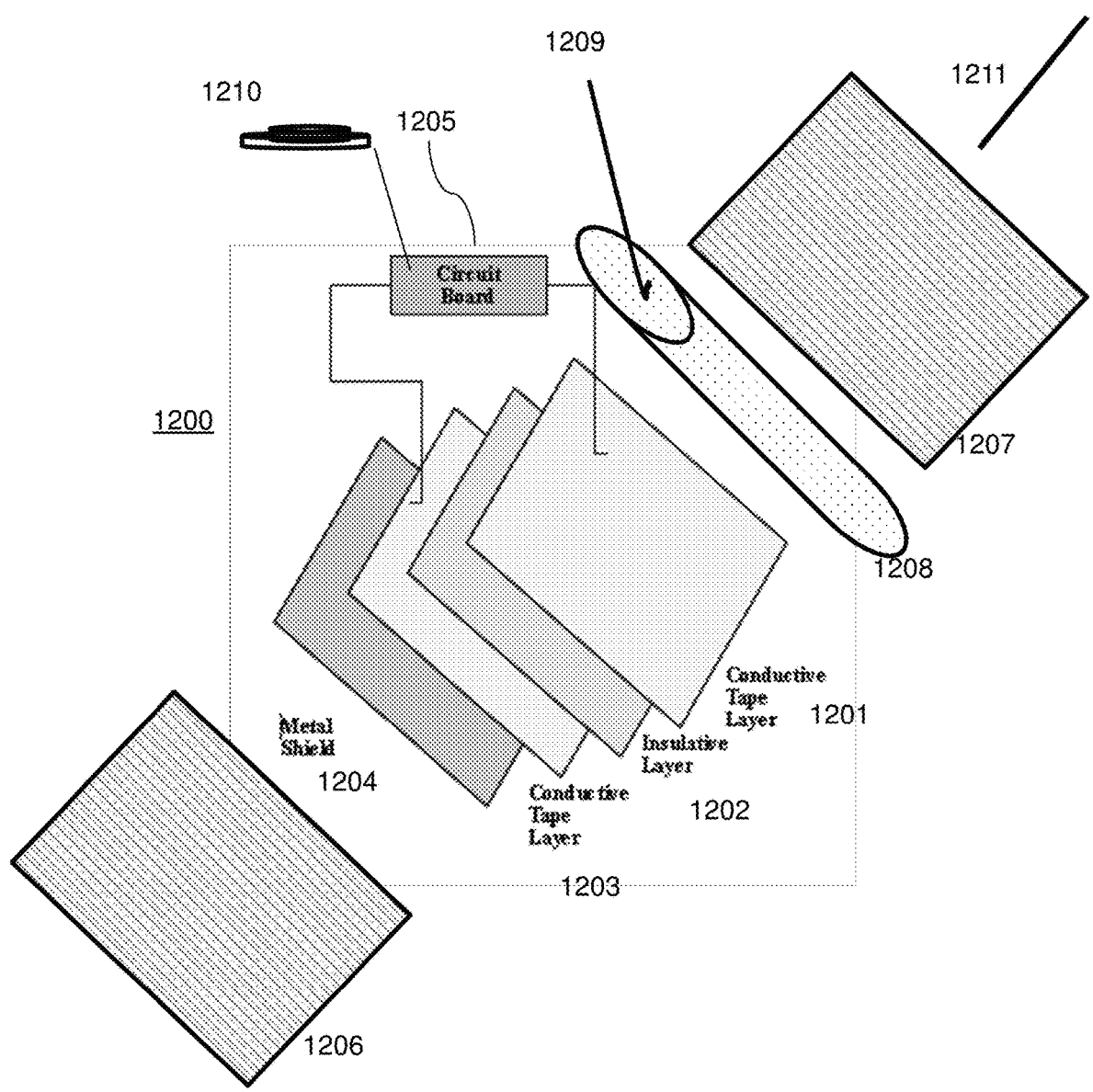
FIG. 12 illustrates a procedure simulation apparatus for mammalian intravenous care.

Referring now to FIG. 12, a procedure simulation apparatus for mammalian intravenous care, is illustrated that includes a sleeve 1200 with an outer surface 1207 and an inner surface 1206. As discussed above, the sleeve 1200 may be configured to be removably attached in a manner that at least partly covers a limb (not shown) of a human being or other mammal or a model of the mammal. In general, the sleeve simulates mammalian tissue and at least the outer layer 1207 the may be fashioned from a silicone of other skin simulated material. The inner layer 1206 may include a material that is comfortable against a wearer's skin, such as a microfleece or nylon. Some additional embodiments may include a layer that simulates biological tissue that reside under the outer layer 1207 emulating skin and above the blood vessel 1209. The biological tissue, may include fat or dermis. The additional layer (not shown) may include a foam or other pierceable material.

A pierceable artificial blood vessel 1208 is positioned between the outer layer and the inner layer and positionable to emulate a position of a blood vessel in the limb of the mammal. The blood vessel 1206 may include simulated blood 1209. Preferably the blood vessel 1206 is created from an expandable material such as silicon and is pressurized with a quantity of simulated blood such that the blood may be withdrawn with a needle, catheter or other device and stored in a blood storage tube. Execution of a correct procedure may include withdrawal of the artificial blood 1209 from the blood vessel without activation of an alert circuit (discussed below).

A first conductive layer 1201 and a second conductive layer 1202 are positioned proximate to the pierceable artificial blood vessel and are insulated from each other via an insulator layer 1202 placed between the first conductive layer 1201 and the second conductive layer 1203. The insulator layer 1202 electrically insulates the first conductive layer from the second conductive layer;

A source of electrical current 1210 is in electrical communication with the first conductive layer and insulated from the second conductive layer while the apparatus 1200 is in a state of rest, such as, for example while a procedure is not being conducted.

A conductive needle 1211 is used to pierce the outer layer 1207 and blood vessel 1206 during a procedure. The needle 1211 is capable of piercing the artificial blood vessel 1208 with an amount of force congruent to pierce a mammalian blood vessel. The needle 1211 is also capable of piercing the first conductive layer 1201 and the insulator layer 1202 during an errant insertion of the needle into the apparatus 1200. Piercing the first conductive layer 1201 and the insulator layer 1202 places the first conductive layer in electrical communication with the second conductive layer thereby providing electrical current from the first conducive layer 1201 to the second conductive layer 1203 and completing an alert circuit 1205 providing human recognizable feedback when the second conductive layer receives electrical current.

In some embodiments, a protective layer 1204 that may be a metal such as, by way of example a layer of aluminum is placed between the second conductive layer 1203 and the inner surface 1206. The protective layer 1204 provides puncture resistance to protect the conductive needle from passing through the first conductive layer, the insulator layer and the second conductive layer and through the inner surface. The protective layer may alternatively include a plastic, nylon or web that is effective at providing puncture protection.

In still other aspects of the innovation provided herein, an audio transmitter may produce an audio feedback when the second conductive layer receives electrical current. An audio recording device may be included and configured to record voice recitations while a procedure involving insertion of the conductive needle into the artificial blood vessel is performed. A timing device for synchronizing the voice recitations captured using the audio recording device with the one or more actions pertaining to withdrawal of simulated blood from the artificial blood vessel.

Figure 13:
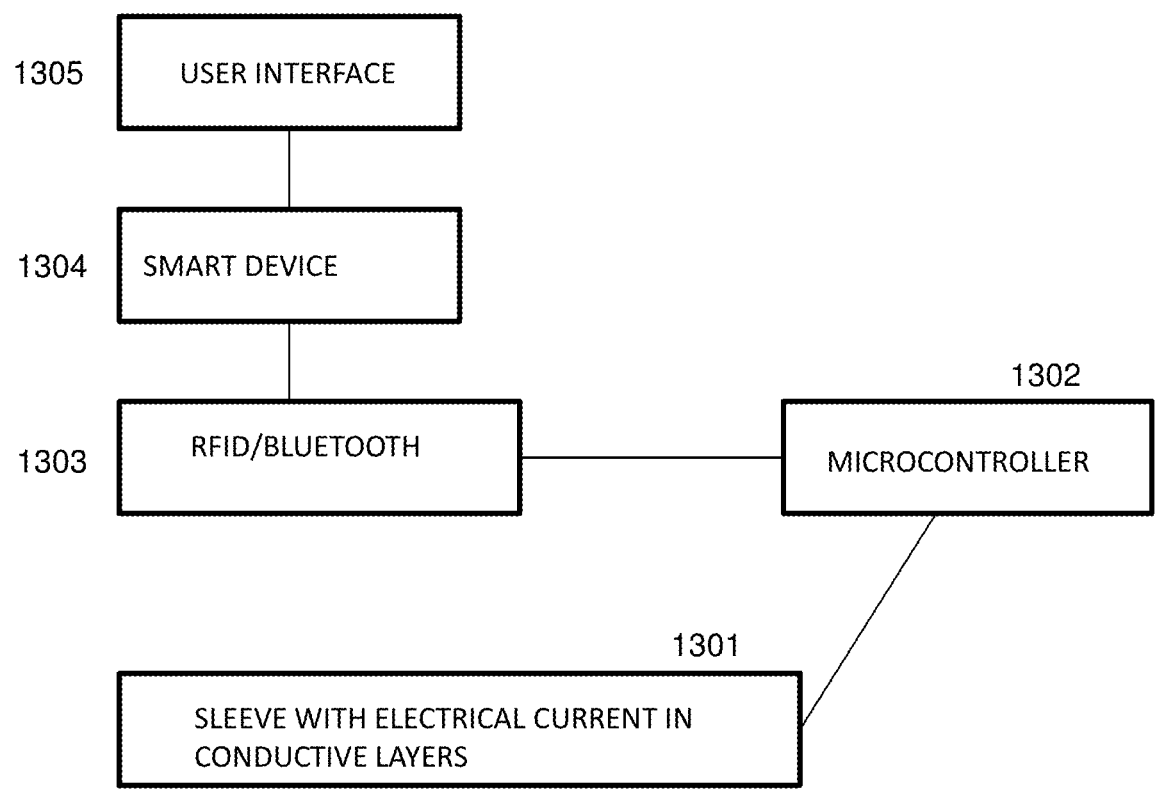
FIG. 13 is a block diagram illustrating exemplary relationships between components in accordance with an embodiment of the present disclosure.

Referring now to FIG. 13, a block diagram that corresponds with the devices and procedures discussed above. Essentially, a sleeve 1301 with electrical current in conductive layers may provide an electrical signal to a microcontroller 1302. The microcontroller may include, for example a 32-bit ARM microcontroller that processes the signal received with logic stored in the microcontroller.

Upon receipt of a reset command, the microcontroller 1302 may establish a connection via near field communications, such as RFID or Bluetooth 1303, with a smart device 1304 or other controller. It will also reset a timer to provide for a timed sequence of events and audio records associated with a procedure. The smart device 1304 may provide a human recognizable user interface 1305 that may receive information from a user and display information to the user. The information received and/or displayed, may include, by way of non-limiting example, a practitioner performing a procedure, a supervisor, a time and date of the procedure, a place of the procedure, a type of procedure, a technique utilized during the procedure, a result of the procedure and other related information. In addition, an audio record of dialogue between the student and supervisor may be recorded and in some embodiments, correlated via a timing index with steps of a procedure.

A number of embodiments of the present disclosure have been described. While this specification contains many specific implementation details, the specific implementation details should not be construed as limitations on the scope of any disclosures or of what may be claimed, but rather as descriptions of features specific to particular embodiments of the present disclosure.

Embodiments, as disclosed above, are directed to a medical procedure simulation apparatus that provides opportunities to improve critical thinking skills by an assessment of a person prior to interventions and re-assessment after interventions of the same person. Opportunities for increasing and improving communication opportunities between the standardized patient and student/clinician. Embodiments, as disclosed above, are directed to a cost-effective product that operationalizes and actively simulates a variety of medical and veterinary procedures.

By way of non-limiting example, procedures may include DVT (humans); Gangrene wound (humans and animals) and additional wounds with blood and/or exudate for all body parts including head (humans and animals); sleeve for arm or leg: compartment syndrome and lactation breasts.

Certain features that are described in this specification in the context of separate embodiments can also be implemented in combination in a single embodiment. Conversely, various features that are described in the context of a single embodiment can also be implemented in combination in multiple embodiments separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in a sequential order, or that all illustrated operations be performed, to achieve desirable results. Moreover, the separation of various system components in the embodiments described above should not be understood as requiring such separation in all embodiments, and the described program components and systems can generally be integrated together in a single software product or packaged into multiple software products.

In certain implementations, multitasking and parallel processing may be advantageous. Nevertheless, it will be understood that various modifications may be made without departing from the spirit and scope of the claimed disclosure.

What is claimed is:

1. An apparatus for simulation of treatment of a mammal, the apparatus comprising:
   a simulated mammalian body part comprising an artificial blood vessel and tissue suitable for simulating at least one of: dialysis arteriovenous (AV), fistula, veni-punctures, and intravenous therapy;
   an attaching substrate for fixedly attaching the simulated mammalian body part to a mammal;
   one or more sensors configured to provide a quantified measurement of one or more actions useful to determine a level of proficiency demonstrated by a practitioner performing a medical procedure simulation on the simulated body part, pertaining to at least one simulation procedure, performed on the one or more anatomical replications of mammalian tissue;
   a conductive layer such that an insertion of a clinical tool through the simulated mammalian body part completes an electrical circuit upon contact with the clinical tool;
   a protective layer providing puncture resistance to prevent the clinical tool from passing through the simulated body part into the mammal; and
   a virtual reality system configured to receive one or more input signals from the one or more sensors, wherein the virtual reality system is further configured to display a visual representation of the medical procedure simulation at least one of: dialysis arteriovenous (AV) graft, fistula, veni-punctures, and intravenous therapy based on the one or more input signals from the one or more sensors and provide immediate or summarized feedback via an audio or visual cue and data displayed a user interface.

2. The apparatus of claim 1, wherein the simulated mammalian body part is a multi-vessel arm-sleeve comprising one or more blood vessels as the one or more anatomical replications, the multi-vessel arm-sleeve configured to simulate AV grafts and fistulas as the medical procedure simulation.

3. The apparatus of claim 1, wherein the simulated mammalian body part is a multi-vein arm-sleeve comprising one or more veins as the one or more anatomical replications, the multi-vein arm-sleeve being configured to simulate veni-punctures and intravenous therapy as the at least one simulation procedure.

4. The apparatus of claim 1, wherein the simulated mammalian body part is a multi-vessel chest comprising an artery, a vein and an organ as the one or more anatomical replications, the multi-vessel chest being configured to simulate jugular punctures, emergency fluid infusion, chemotherapy infusion, administration of specific medications, emergency hemodialysis filtration, and infusion of blood products as the at least one simulation procedure.

5. The apparatus of claim 1, wherein the simulated mammalian body part is a bib-style device configured to be worn around a neck of the mammal or the model of the mammal, the bib-style device simulating tracheostomy care and tracheostomy tube replacement as the at least one simulation procedure.

6. The apparatus of claim 5, wherein the bib-style device further comprises:
   a bib configured to at least partly cover a torso of the mammal or the model of the mammal, the bib simulating one or more truncal tissues;
   a collar connected with the bib, the collar including a stoma;
   an outer cannula received at least partly within the stoma, the outer cannula including a flange or a neck plate,
   an inner cannula received within the outer cannula;
   an obturator received within the inner cannula; and
   an inflatable bag coupled to the outer cannula.

7. The apparatus of claim 1, wherein the simulated mammalian body part is a three-fingered glove, the three-fingered glove simulating finger-stick glucose checks as the at least one simulation procedure.

8. The apparatus of claim 1 further comprising:
   an audio recording device configured to record voice recitations; and
   a timing device for synchronizing the voice recitations captured using the audio recording device with the one or more actions pertaining to the at least one simulation procedure.

9. The apparatus of claim 1, wherein the virtual reality system further comprises:
   a communication interface configured to receive the one or more input signals from the one or more sensors;
   a processor that is configured to generate the at least one visual representation of the at least one simulation procedure being performed on the one or more anatomical replications based on the one or more input signals;
   a memory configured to store information relating to the at least one visual representation, the at least one simulation procedure and the one or more input signals; and
   a display for displaying the at least one visual representation.

10. The apparatus of claim 9, wherein the virtual reality system further comprises:
    a communication interface configured to receive the one or more input signal from the one or more sensors;
    a processor that is configured to generate the at least one visual representation of the at least one medical procedure being performed on the arm-sleeve based on the one or more input signals;

a memory configured to store information relating to the at least one visual representation, the at least one medical procedure and the one or more input signals; and a display for displaying the visual representation.

* * * * *